US009548557B2

(12) United States Patent
Liu (10) Patent No.: US 9,548,557 B2
(45) Date of Patent: Jan. 17, 2017

(54) CONNECTOR ASSEMBLIES AND METHODS OF MANUFACTURE

(71) Applicant: Corning Cable Systems LLC, Hickory, NC (US)

(72) Inventor: Ziwei Liu, Ft. Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 280 days.

(21) Appl. No.: 13/927,537

(22) Filed: Jun. 26, 2013

(65) Prior Publication Data

US 2015/0004822 A1  Jan. 1, 2015

(51) Int. Cl.
| | |
|---|---|
| *H01R 4/24* | (2006.01) |
| *H01R 13/52* | (2006.01) |
| *H01R 43/18* | (2006.01) |
| *H01R 13/03* | (2006.01) |
| *H01R 43/00* | (2006.01) |
| H01R 9/24 | (2006.01) |
| H01R 43/01 | (2006.01) |

(52) U.S. Cl.
CPC ........ *H01R 13/5221* (2013.01); *H01R 4/2404* (2013.01); *H01R 13/03* (2013.01); *H01R 43/005* (2013.01); *H01R 43/18* (2013.01); H01R 4/2429 (2013.01); H01R 9/24 (2013.01); H01R 43/01 (2013.01); Y10T 29/4922 (2015.01)

(58) Field of Classification Search
CPC ..... H01R 13/03; H01R 13/5221; H01R 43/18; H01R 43/005
USPC .......................... 439/387, 389, 391, 395, 397
See application file for complete search history.

(56) References Cited

U.S. PATENT DOCUMENTS

| | | |
|---|---|---|
| 331,169 A | 11/1885 | Thomas |
| 346,958 A | 8/1886 | Stone |
| 459,951 A | 9/1891 | Warner |

(Continued)

FOREIGN PATENT DOCUMENTS

| | | |
|---|---|---|
| CA | 2096710 | 11/1994 |
| CN | 201149936 | 11/2008 |

(Continued)

OTHER PUBLICATIONS

Patent Cooperation Treaty International Search Report for PCT/US2014/043311, Mail date Oct. 7, 2014, 3 pages.

(Continued)

*Primary Examiner* — Tulsidas C Patel
*Assistant Examiner* — Travis Chambers
(74) *Attorney, Agent, or Firm* — Robert Low Branham (57) ABSTRACT

A connector assembly that includes an insulation displacement member including a hydrophobic organosilane monolayer protective coating is disclosed. In one embodiment, the connector assembly may be manufactured by a method that includes assembling the connector assembly, contacting the connector assembly with an organosilane coating solution, and curing the organosilane coating solution. The connector assembly may be assembled by mechanically supporting the insulation displacement member with a connector framework. The connector assembly may be contacted with the organosilane coating solution by contacting at least the wire engaging portion of the insulation displacement member and at least a portion of the connector assembly with the organosilane coating solution.

10 Claims, 2 Drawing Sheets

(56) References Cited

U.S. PATENT DOCUMENTS

| | | |
|---|---|---|
| 589,216 A | 8/1897 | McKee |
| 1,371,742 A | 3/1921 | Dringman |
| 1,488,175 A | 3/1924 | Strandell |
| 1,667,485 A | 4/1928 | MacDonald |
| 1,766,869 A | 6/1930 | Austin |
| 1,801,999 A | 4/1931 | Bowman |
| 1,885,761 A | 11/1932 | Peirce, Jr. |
| 1,959,302 A | 5/1934 | Paige |
| 2,013,526 A | 9/1935 | Schmitt |
| 2,059,920 A | 11/1936 | Weatherhead, Jr. |
| 2,102,495 A | 12/1937 | England |
| 2,258,528 A | 10/1941 | Wurzburger |
| 2,258,737 A | 10/1941 | Browne |
| 2,325,549 A | 7/1943 | Ryzowitz |
| 2,480,963 A | 9/1949 | Quinn |
| 2,544,654 A | 3/1951 | Brown |
| 2,549,647 A | 4/1951 | Turenne |
| 2,694,187 A | 11/1954 | Nash |
| 2,705,652 A | 4/1955 | Kaiser |
| 2,743,505 A | 5/1956 | Hill |
| 2,754,487 A | 7/1956 | Carr et al. |
| 2,755,331 A | 7/1956 | Melcher |
| 2,757,351 A | 7/1956 | Klostermann |
| 2,762,025 A | 9/1956 | Melcher |
| 2,785,384 A | 3/1957 | Wickesser |
| 2,805,399 A | 9/1957 | Leeper |
| 2,816,949 A | 12/1957 | Curtiss |
| 2,870,420 A | 1/1959 | Malek |
| 2,878,039 A | 3/1959 | Hoegee et al. |
| 2,881,406 A | 4/1959 | Arson |
| 2,963,536 A | 12/1960 | Kokalas |
| 3,001,169 A | 9/1961 | Blonder |
| 3,015,794 A | 1/1962 | Kishbaugh |
| 3,051,925 A | 8/1962 | Felts |
| 3,091,748 A | 5/1963 | Takes et al. |
| 3,094,364 A | 6/1963 | Lingg |
| 3,103,548 A | 9/1963 | Concelman |
| 3,106,548 A | 10/1963 | Lavalou |
| 3,140,106 A | 7/1964 | Thomas et al. |
| 3,161,451 A | 12/1964 | Neidecker |
| 3,184,706 A | 5/1965 | Atkins |
| 3,193,309 A | 7/1965 | Morris |
| 3,194,292 A | 7/1965 | Borowsky |
| 3,196,382 A | 7/1965 | Morello, Jr. |
| 3,206,540 A | 9/1965 | Cohen |
| 3,245,027 A | 4/1966 | Ziegler, Jr. |
| 3,275,913 A | 9/1966 | Blanchard et al. |
| 3,278,890 A | 10/1966 | Cooney |
| 3,281,756 A | 10/1966 | O'Keefe et al. |
| 3,281,757 A | 10/1966 | Bonhomme |
| 3,290,069 A | 12/1966 | Davis |
| 3,292,136 A | 12/1966 | Somerset |
| 3,320,575 A | 5/1967 | Brown et al. |
| 3,321,732 A | 5/1967 | Forney, Jr. |
| 3,336,563 A | 8/1967 | Hyslop |
| 3,348,186 A | 10/1967 | Rosen |
| 3,350,667 A | 10/1967 | Shreve |
| 3,350,677 A | 10/1967 | Daum |
| 3,355,698 A | 11/1967 | Keller |
| 3,372,364 A | 3/1968 | O'Keefe et al. |
| 3,373,243 A | 3/1968 | Janowiak et al. |
| 3,390,374 A | 6/1968 | Forney, Jr. |
| 3,406,373 A | 10/1968 | Forney, Jr. |
| 3,430,184 A | 2/1969 | Acord |
| 3,448,430 A | 6/1969 | Kelly |
| 3,453,376 A | 7/1969 | Ziegler, Jr. et al. |
| 3,465,281 A | 9/1969 | Florer |
| 3,475,545 A | 10/1969 | Stark et al. |
| 3,494,400 A | 2/1970 | McCoy et al. |
| 3,498,647 A | 3/1970 | Schroder |
| 3,499,671 A | 3/1970 | Osborne |
| 3,501,737 A | 3/1970 | Harris et al. |
| 3,517,373 A | 6/1970 | Jamon |
| 3,526,871 A | 9/1970 | Hobart |
| 3,533,051 A | 10/1970 | Ziegler, Jr. |
| 3,537,065 A | 10/1970 | Winston |
| 3,544,705 A | 12/1970 | Winston |
| 3,551,882 A | 12/1970 | O'Keefe |
| 3,564,487 A | 2/1971 | Upstone et al. |
| 3,587,033 A | 6/1971 | Brorein et al. |
| 3,596,933 A | 8/1971 | Luckenbill |
| 3,601,776 A | 8/1971 | Curl |
| 3,603,912 A | 9/1971 | Kelly |
| 3,614,711 A | 10/1971 | Anderson et al. |
| 3,622,952 A | 11/1971 | Hilbert |
| 3,629,792 A | 12/1971 | Dorrell |
| 3,633,150 A | 1/1972 | Schwartz |
| 3,646,502 A | 2/1972 | Hutter et al. |
| 3,663,926 A | 5/1972 | Brandt |
| 3,665,371 A | 5/1972 | Cripps |
| 3,668,612 A | 6/1972 | Nepovim |
| 3,669,472 A | 6/1972 | Nadsady |
| 3,671,922 A | 6/1972 | Zerlin et al. |
| 3,671,926 A | 6/1972 | Nepovim |
| 3,678,444 A | 7/1972 | Stevens et al. |
| 3,678,445 A | 7/1972 | Brancaleone |
| 3,680,034 A | 7/1972 | Chow et al. |
| 3,681,739 A | 8/1972 | Kornick |
| 3,683,320 A | 8/1972 | Woods et al. |
| 3,686,623 A | 8/1972 | Nijman |
| 3,694,792 A | 9/1972 | Wallo |
| 3,694,793 A | 9/1972 | Concelman |
| 3,697,930 A | 10/1972 | Shirey |
| 3,706,958 A | 12/1972 | Blanchenot |
| 3,708,186 A | 1/1973 | Takagi et al. |
| 3,710,005 A | 1/1973 | French |
| 3,739,076 A | 6/1973 | Schwartz |
| 3,744,007 A | 7/1973 | Horak |
| 3,744,011 A | 7/1973 | Blanchenot |
| 3,761,870 A | 9/1973 | Drezin et al. |
| 3,778,535 A | 12/1973 | Forney, Jr. |
| 3,781,762 A | 12/1973 | Quackenbush |
| 3,781,898 A | 12/1973 | Holloway |
| 3,783,178 A | 1/1974 | Philibert et al. |
| 3,787,796 A | 1/1974 | Barr |
| 3,793,610 A | 2/1974 | Brishka |
| 3,798,589 A | 3/1974 | Deardurff |
| 3,808,580 A | 4/1974 | Johnson |
| 3,810,076 A | 5/1974 | Hutter |
| 3,824,026 A | 7/1974 | Gaskins |
| 3,835,443 A | 9/1974 | Arnold et al. |
| 3,836,700 A | 9/1974 | Niemeyer |
| 3,845,453 A | 10/1974 | Hemmer |
| 3,846,738 A | 11/1974 | Nepovim |
| 3,847,463 A | 11/1974 | Hayward et al. |
| 3,854,003 A | 12/1974 | Duret |
| 3,854,789 A | 12/1974 | Kaplan |
| 3,858,156 A | 12/1974 | Zarro |
| 3,879,102 A | 4/1975 | Horak |
| 3,886,301 A | 5/1975 | Cronin et al. |
| 3,907,335 A | 9/1975 | Burge et al. |
| 3,907,399 A | 9/1975 | Spinner |
| 3,910,673 A | 10/1975 | Stokes |
| 3,915,539 A | 10/1975 | Collins |
| 3,936,132 A | 2/1976 | Hutter |
| 3,937,547 A | 2/1976 | Lee-Kemp |
| 3,953,097 A | 4/1976 | Graham |
| 3,960,428 A | 6/1976 | Naus et al. |
| 3,963,320 A | 6/1976 | Spinner |
| 3,963,321 A | 6/1976 | Burger et al. |
| 3,970,355 A | 7/1976 | Pitschi |
| 3,972,013 A | 7/1976 | Shapiro |
| 3,976,352 A | 8/1976 | Spinner |
| 3,980,805 A | 9/1976 | Lipari |
| 3,985,418 A | 10/1976 | Spinner |
| 3,986,736 A | 10/1976 | Takagi et al. |
| 4,012,105 A | 3/1977 | Biddle |
| 4,017,139 A | 4/1977 | Nelson |
| 4,022,966 A | 5/1977 | Gajajiva |
| 4,030,742 A | 6/1977 | Eidelberg et al. |
| 4,030,798 A | 6/1977 | Paoli |
| 4,032,177 A | 6/1977 | Anderson |
| 4,045,706 A | 8/1977 | Daffner et al. |
| 4,046,451 A | 9/1977 | Juds et al. |

(56) References Cited

U.S. PATENT DOCUMENTS

| | | |
|---|---|---|
| 4,053,200 A | 10/1977 | Pugner |
| 4,056,043 A | 11/1977 | Sriramamurty et al. |
| 4,059,330 A | 11/1977 | Shirey |
| 4,079,343 A | 3/1978 | Nijman |
| 4,082,404 A | 4/1978 | Flatt |
| 4,090,028 A | 5/1978 | Vontobel |
| 4,093,335 A | 6/1978 | Schwartz et al. |
| 4,100,943 A | 7/1978 | Terada et al. |
| 4,106,839 A | 8/1978 | Cooper |
| 4,109,126 A | 8/1978 | Halbeck |
| 4,118,097 A * | 10/1978 | Budnick ............... H01R 11/288 439/387 |
| 4,125,308 A | 11/1978 | Schilling |
| 4,126,372 A | 11/1978 | Hashimoto et al. |
| 4,131,332 A | 12/1978 | Hogendobler et al. |
| 4,136,897 A | 1/1979 | Haluch |
| 4,150,250 A | 4/1979 | Lundeberg |
| 4,153,320 A | 5/1979 | Townshend |
| 4,156,554 A | 5/1979 | Aujla |
| 4,165,911 A | 8/1979 | Laudig |
| 4,168,921 A | 9/1979 | Blanchard |
| 4,169,646 A * | 10/1979 | Stape ............... H01R 12/675 439/395 |
| 4,173,385 A | 11/1979 | Fenn et al. |
| 4,174,875 A | 11/1979 | Wilson et al. |
| 4,187,481 A | 2/1980 | Bourtos |
| 4,193,655 A | 3/1980 | Herrmann, Jr. |
| 4,194,338 A | 3/1980 | Trafton |
| 4,197,628 A | 4/1980 | Conti et al. |
| 4,206,963 A | 6/1980 | English et al. |
| 4,212,487 A | 7/1980 | Jones et al. |
| 4,225,162 A | 9/1980 | Dola |
| 4,227,765 A | 10/1980 | Neumann et al. |
| 4,229,714 A | 10/1980 | Yu |
| 4,239,318 A | 12/1980 | Schwartz |
| 4,250,348 A | 2/1981 | Kitagawa |
| 4,260,212 A * | 4/1981 | Ritchie ............... H01R 4/2425 29/885 |
| 4,273,405 A | 6/1981 | Law |
| 4,280,749 A | 7/1981 | Hemmer |
| 4,285,564 A | 8/1981 | Spinner |
| 4,290,663 A | 9/1981 | Fowler et al. |
| 4,296,986 A | 10/1981 | Herrmann, Jr. |
| 4,307,926 A | 12/1981 | Smith |
| 4,309,050 A | 1/1982 | Legris |
| 4,310,211 A | 1/1982 | Bunnell et al. |
| 4,322,121 A | 3/1982 | Riches et al. |
| 4,326,768 A | 4/1982 | Punako |
| 4,326,769 A | 4/1982 | Dorsey et al. |
| 4,334,730 A | 6/1982 | Colwell et al. |
| 4,339,166 A | 7/1982 | Dayton |
| 4,345,375 A | 8/1982 | Hayward |
| 4,346,958 A | 8/1982 | Blanchard |
| 4,354,721 A | 10/1982 | Luzzi |
| 4,358,174 A | 11/1982 | Dreyer |
| 4,373,767 A | 2/1983 | Cairns |
| 4,389,081 A | 6/1983 | Gallusser et al. |
| 4,400,050 A | 8/1983 | Hayward |
| 4,407,529 A | 10/1983 | Holman |
| 4,408,821 A | 10/1983 | Forney, Jr. |
| 4,408,822 A | 10/1983 | Nikitas |
| 4,412,717 A | 11/1983 | Monroe |
| 4,421,377 A | 12/1983 | Spinner |
| 4,426,127 A | 1/1984 | Kubota |
| 4,428,639 A | 1/1984 | Hillis |
| 4,444,453 A | 4/1984 | Kirby et al. |
| 4,447,107 A | 5/1984 | Major et al. |
| 4,452,503 A | 6/1984 | Forney, Jr. |
| 4,456,323 A | 6/1984 | Pitcher et al. |
| 4,459,881 A | 7/1984 | Hughes, Jr. |
| 4,462,653 A | 7/1984 | Flederbach et al. |
| 4,464,000 A | 8/1984 | Werth et al. |
| 4,464,001 A | 8/1984 | Collins |
| 4,469,386 A | 9/1984 | Ackerman |
| 4,470,657 A | 9/1984 | Deacon |
| 4,477,132 A | 10/1984 | Moser et al. |
| 4,484,792 A | 11/1984 | Tengler et al. |
| 4,484,796 A | 11/1984 | Sato et al. |
| 4,490,576 A | 12/1984 | Bolante et al. |
| 4,491,685 A | 1/1985 | Drew et al. |
| 4,506,943 A | 3/1985 | Drogo |
| 4,515,427 A | 5/1985 | Smit |
| 4,525,017 A | 6/1985 | Schildkraut et al. |
| 4,531,790 A | 7/1985 | Selvin |
| 4,531,805 A | 7/1985 | Werth |
| 4,533,191 A | 8/1985 | Blackwood |
| 4,540,231 A | 9/1985 | Forney, Jr. |
| RE31,995 E | 10/1985 | Ball |
| 4,545,633 A | 10/1985 | McGeary |
| 4,545,637 A | 10/1985 | Bosshard et al. |
| 4,553,877 A | 11/1985 | Edvardsen |
| 4,575,274 A | 3/1986 | Hayward |
| 4,580,862 A | 4/1986 | Johnson |
| 4,580,865 A | 4/1986 | Fryberger |
| 4,583,811 A | 4/1986 | McMills |
| 4,585,289 A | 4/1986 | Bocher |
| 4,588,246 A | 5/1986 | Schildkraut et al. |
| 4,593,964 A | 6/1986 | Forney, Jr. et al. |
| 4,596,434 A | 6/1986 | Saba et al. |
| 4,596,435 A | 6/1986 | Bickford |
| 4,597,621 A | 7/1986 | Burns |
| 4,598,959 A | 7/1986 | Selvin |
| 4,598,961 A | 7/1986 | Cohen |
| 4,600,263 A | 7/1986 | DeChamp et al. |
| 4,613,199 A | 9/1986 | McGeary |
| 4,614,390 A | 9/1986 | Baker |
| 4,616,900 A | 10/1986 | Cairns |
| 4,623,205 A | 11/1986 | Barron |
| 4,632,487 A | 12/1986 | Wargula |
| 4,634,213 A | 1/1987 | Larsson et al. |
| 4,640,572 A | 2/1987 | Conlon |
| 4,645,281 A | 2/1987 | Burger |
| 4,647,135 A | 3/1987 | Reinhardt |
| 4,650,228 A | 3/1987 | McMills et al. |
| 4,655,159 A | 4/1987 | McMills |
| 4,655,534 A | 4/1987 | Stursa |
| 4,660,921 A | 4/1987 | Hauver |
| 4,666,190 A | 5/1987 | Yamabe et al. |
| 4,666,231 A | 5/1987 | Sheesley et al. |
| 4,668,043 A | 5/1987 | Saba et al. |
| 4,670,574 A * | 6/1987 | Malcolm ............... C07F 7/0896 556/478 |
| 4,673,236 A | 6/1987 | Musolff et al. |
| 4,674,809 A | 6/1987 | Hollyday et al. |
| 4,674,818 A | 6/1987 | McMills et al. |
| 4,676,577 A | 6/1987 | Szegda |
| 4,682,832 A | 7/1987 | Punako et al. |
| 4,684,201 A | 8/1987 | Hutter |
| 4,688,876 A | 8/1987 | Morelli |
| 4,688,878 A | 8/1987 | Cohen et al. |
| 4,690,482 A | 9/1987 | Chamberland et al. |
| 4,691,976 A | 9/1987 | Cowen |
| 4,703,987 A | 11/1987 | Gullusser et al. |
| 4,703,988 A | 11/1987 | Raux et al. |
| 4,713,021 A | 12/1987 | Kobler |
| 4,717,355 A | 1/1988 | Mattis |
| 4,720,155 A | 1/1988 | Schildkraut et al. |
| 4,728,301 A | 3/1988 | Hemmer et al. |
| 4,734,050 A | 3/1988 | Negre et al. |
| 4,734,666 A | 3/1988 | Ohya et al. |
| 4,737,123 A | 4/1988 | Paler et al. |
| 4,738,009 A | 4/1988 | Down et al. |
| 4,738,628 A | 4/1988 | Rees |
| 4,739,126 A | 4/1988 | Gutter et al. |
| 4,746,305 A | 5/1988 | Nomura |
| 4,747,656 A | 5/1988 | Miyahara et al. |
| 4,747,786 A | 5/1988 | Hayashi et al. |
| 4,749,821 A | 6/1988 | Linton et al. |
| 4,755,152 A | 7/1988 | Elliot et al. |
| 4,757,297 A | 7/1988 | Frawley |
| 4,759,729 A | 7/1988 | Kemppainen et al. |
| 4,761,146 A | 8/1988 | Sohoel |
| 4,772,222 A | 9/1988 | Laudig et al. |
| 4,789,355 A | 12/1988 | Lee |

(56) References Cited

U.S. PATENT DOCUMENTS

| | | |
|---|---|---|
| 4,789,759 A | 12/1988 | Jones |
| 4,795,360 A | 1/1989 | Newman et al. |
| 4,797,120 A | 1/1989 | Ulery |
| 4,806,116 A | 2/1989 | Ackerman |
| 4,807,891 A | 2/1989 | Neher |
| 4,808,128 A | 2/1989 | Werth |
| 4,810,017 A | 3/1989 | Knak et al. |
| 4,813,886 A | 3/1989 | Roos et al. |
| 4,820,185 A | 4/1989 | Moulin |
| 4,834,675 A | 5/1989 | Samchisen |
| 4,834,676 A | 5/1989 | Tackett |
| 4,835,342 A | 5/1989 | Guginsky |
| 4,836,580 A | 6/1989 | Farrell |
| 4,836,801 A | 6/1989 | Ramirez |
| 4,838,813 A | 6/1989 | Pauza et al. |
| 4,846,731 A | 7/1989 | Alwine |
| 4,854,893 A | 8/1989 | Morris |
| 4,857,014 A | 8/1989 | Alf et al. |
| 4,867,489 A | 9/1989 | Patel |
| 4,867,706 A | 9/1989 | Tang |
| 4,869,679 A | 9/1989 | Szegda |
| 4,874,331 A | 10/1989 | Iverson |
| 4,881,912 A | 11/1989 | Thommen et al. |
| 4,892,275 A | 1/1990 | Szegda |
| 4,902,246 A | 2/1990 | Samchisen |
| 4,906,207 A | 3/1990 | Banning et al. |
| 4,915,651 A | 4/1990 | Bout |
| 4,921,447 A | 5/1990 | Capp et al. |
| 4,923,412 A | 5/1990 | Morris |
| 4,925,403 A | 5/1990 | Zorzy |
| 4,927,385 A | 5/1990 | Cheng |
| 4,929,188 A | 5/1990 | Lionetto et al. |
| 4,934,960 A | 6/1990 | Capp et al. |
| 4,938,718 A | 7/1990 | Guendel |
| 4,941,846 A | 7/1990 | Guimond et al. |
| 4,952,174 A | 8/1990 | Sucht et al. |
| 4,957,456 A | 9/1990 | Olson et al. |
| 4,963,105 A | 10/1990 | Lewis et al. |
| 4,964,805 A | 10/1990 | Gabany |
| 4,964,812 A | 10/1990 | Siemon et al. |
| 4,973,265 A | 11/1990 | Heeren |
| 4,976,632 A | 12/1990 | Riches |
| 4,979,911 A | 12/1990 | Spencer |
| 4,990,104 A | 2/1991 | Schieferly |
| 4,990,105 A | 2/1991 | Karlovich |
| 4,990,106 A | 2/1991 | Szegda |
| 4,992,061 A | 2/1991 | Brush, Jr. et al. |
| 5,002,503 A | 3/1991 | Campbell et al. |
| 5,007,861 A | 4/1991 | Stirling |
| 5,011,422 A | 4/1991 | Yeh |
| 5,011,432 A | 4/1991 | Sucht et al. |
| 5,018,822 A | 5/1991 | Freismuth et al. |
| 5,021,010 A | 6/1991 | Wright |
| 5,024,606 A | 6/1991 | Ming-Hwa |
| 5,030,126 A | 7/1991 | Hanlon |
| 5,037,328 A | 8/1991 | Karlovich |
| 5,046,964 A | 9/1991 | Welsh et al. |
| 5,052,947 A | 10/1991 | Brodie et al. |
| 5,055,060 A | 10/1991 | Down et al. |
| 5,059,139 A | 10/1991 | Spinner |
| 5,059,747 A | 10/1991 | Bawa et al. |
| 5,062,804 A | 11/1991 | Jamet et al. |
| 5,066,248 A | 11/1991 | Gaver, Jr. et al. |
| 5,067,912 A | 11/1991 | Bickford et al. |
| 5,073,129 A | 12/1991 | Szegda |
| 5,074,809 A | 12/1991 | Rousseau et al. |
| 5,080,600 A | 1/1992 | Baker et al. |
| 5,083,943 A | 1/1992 | Tarrant |
| 5,088,937 A | 2/1992 | Gabany |
| 5,120,260 A | 6/1992 | Jackson |
| 5,127,853 A | 7/1992 | McMills et al. |
| 5,131,862 A | 7/1992 | Gershfeld |
| 5,137,470 A | 8/1992 | Doles |
| 5,137,471 A | 8/1992 | Verespej et al. |
| 5,139,440 A | 8/1992 | Volk et al. ............ 439/413 |
| 5,141,448 A | 8/1992 | Mattingly et al. |
| 5,141,451 A | 8/1992 | Down |
| 5,149,274 A | 9/1992 | Gallusser et al. |
| 5,150,924 A | 9/1992 | Yokomatsu et al. |
| 5,154,636 A | 10/1992 | Vaccaro et al. |
| 5,161,993 A | 11/1992 | Leibfried, Jr. |
| 5,166,477 A | 11/1992 | Perin, Jr. et al. |
| 5,167,545 A | 12/1992 | O'Brien et al. |
| 5,169,323 A | 12/1992 | Kawai et al. |
| 5,176,530 A * | 1/1993 | Reylek .............. H01R 4/26 439/290 |
| 5,176,533 A | 1/1993 | Sakurai et al. |
| 5,181,161 A | 1/1993 | Hirose et al. |
| 5,183,417 A | 2/1993 | Bools |
| 5,186,501 A | 2/1993 | Mano |
| 5,186,655 A | 2/1993 | Glenday et al. |
| 5,195,904 A | 3/1993 | Cyvoct |
| 5,195,905 A | 3/1993 | Pesci |
| 5,195,906 A | 3/1993 | Szegda |
| 5,205,547 A | 4/1993 | Mattingly |
| 5,205,761 A | 4/1993 | Nilsson |
| D335,487 S | 5/1993 | Volk et al. ............ D13/147 |
| 5,207,602 A | 5/1993 | McMills et al. |
| 5,215,477 A | 6/1993 | Weber et al. |
| 5,217,391 A | 6/1993 | Fisher, Jr. |
| 5,217,392 A | 6/1993 | Hosler, Sr. |
| 5,217,393 A | 6/1993 | Del Negro et al. |
| 5,221,216 A | 6/1993 | Gabany et al. |
| 5,227,587 A | 7/1993 | Paterek |
| 5,247,424 A | 9/1993 | Harris et al. |
| 5,269,701 A | 12/1993 | Leibfried, Jr. |
| 5,281,762 A | 1/1994 | Long et al. |
| 5,283,853 A | 2/1994 | Szegda |
| 5,284,449 A | 2/1994 | Vaccaro |
| 5,294,864 A | 3/1994 | Do |
| 5,295,864 A | 3/1994 | Birch et al. |
| 5,316,348 A | 5/1994 | Franklin |
| 5,316,494 A | 5/1994 | Flanagan et al. |
| 5,318,459 A | 6/1994 | Sheilds |
| 5,321,205 A | 6/1994 | Bawa et al. |
| 5,334,032 A | 8/1994 | Myers et al. |
| 5,334,051 A | 8/1994 | Devine et al. |
| 5,338,225 A | 8/1994 | Jacobsen et al. |
| 5,342,218 A | 8/1994 | McMills et al. |
| 5,352,134 A | 10/1994 | Jacobsen et al. |
| 5,354,217 A | 10/1994 | Gabel et al. |
| 5,362,250 A | 11/1994 | McMills et al. |
| 5,362,251 A | 11/1994 | Bielak |
| 5,366,260 A | 11/1994 | Wartluft |
| 5,371,819 A | 12/1994 | Szegda |
| 5,371,821 A | 12/1994 | Szegda |
| 5,371,827 A | 12/1994 | Szegda |
| 5,380,211 A | 1/1995 | Kawagauchi et al. |
| 5,389,005 A | 2/1995 | Kodama |
| 5,393,244 A | 2/1995 | Szegda |
| 5,397,252 A | 3/1995 | Wang |
| 5,413,504 A | 5/1995 | Kloecker et al. |
| 5,431,583 A | 7/1995 | Szegda |
| 5,435,745 A | 7/1995 | Booth |
| 5,435,751 A | 7/1995 | Papenheim et al. |
| 5,435,760 A | 7/1995 | Miklos |
| 5,439,386 A | 8/1995 | Ellis et al. |
| 5,444,810 A | 8/1995 | Szegda |
| 5,455,548 A | 10/1995 | Grandchamp et al. |
| 5,456,611 A | 10/1995 | Henry et al. |
| 5,456,614 A | 10/1995 | Szegda |
| 5,466,173 A | 11/1995 | Down |
| 5,470,257 A | 11/1995 | Szegda |
| 5,474,478 A | 12/1995 | Ballog |
| 5,475,921 A * | 12/1995 | Johnston ............ H01R 13/03 29/878 |
| 5,488,268 A | 1/1996 | Bauer et al. |
| 5,490,033 A | 2/1996 | Cronin |
| 5,490,801 A | 2/1996 | Fisher, Jr. et al. |
| 5,494,454 A | 2/1996 | Johnsen |
| 5,499,934 A | 3/1996 | Jacobsen et al. |
| 5,501,616 A | 3/1996 | Holliday |
| 5,511,305 A | 4/1996 | Garner |
| 5,516,303 A | 5/1996 | Yohn et al. |

(56) References Cited

U.S. PATENT DOCUMENTS

| | | |
|---|---|---|
| 5,525,076 A | 6/1996 | Down |
| 5,542,861 A | 8/1996 | Anhalt et al. |
| 5,548,088 A | 8/1996 | Gray et al. |
| 5,550,521 A | 8/1996 | Bernaud et al. |
| 5,564,938 A | 10/1996 | Shenkal et al. |
| 5,571,028 A | 11/1996 | Szegda |
| 5,571,029 A | 11/1996 | Poissant et al. |
| 5,586,910 A | 12/1996 | Del Negro et al. |
| 5,595,499 A | 1/1997 | Zander et al. |
| 5,598,132 A | 1/1997 | Stabile |
| 5,607,320 A | 3/1997 | Wright |
| 5,607,325 A | 3/1997 | Toma |
| 5,609,501 A | 3/1997 | McMills et al. |
| 5,620,339 A | 4/1997 | Gray et al. |
| 5,632,637 A | 5/1997 | Diener |
| 5,632,651 A | 5/1997 | Szegda |
| 5,644,104 A | 7/1997 | Porter et al. |
| 5,649,723 A | 7/1997 | Larsson |
| 5,651,698 A | 7/1997 | Locati et al. |
| 5,651,699 A | 7/1997 | Holliday |
| 5,653,605 A | 8/1997 | Woehl et al. |
| 5,667,405 A | 9/1997 | Holliday |
| 5,681,172 A | 10/1997 | Moldenhauer |
| 5,683,263 A | 11/1997 | Hsu |
| 5,702,263 A | 12/1997 | Baumann et al. |
| 5,722,856 A | 3/1998 | Fuchs et al. |
| 5,735,704 A | 4/1998 | Anthony |
| 5,743,131 A | 4/1998 | Holliday et al. |
| 5,746,617 A | 5/1998 | Porter, Jr. et al. |
| 5,746,619 A | 5/1998 | Harting et al. |
| 5,759,618 A * | 6/1998 | Taylor ............ C03C 23/0075 427/140 |
| 5,769,652 A | 6/1998 | Wider |
| 5,769,662 A | 6/1998 | Stabile et al. |
| 5,774,344 A | 6/1998 | Casebolt |
| 5,775,927 A | 7/1998 | Wider |
| 5,788,289 A | 8/1998 | Cronley |
| 5,791,698 A | 8/1998 | Wartluft et al. |
| 5,797,633 A | 8/1998 | Katzer et al. |
| 5,817,978 A | 10/1998 | Hermant et al. |
| 5,863,220 A | 1/1999 | Holliday |
| 5,874,603 A * | 2/1999 | Arkles ................ B01J 20/287 556/400 |
| 5,877,452 A | 3/1999 | McConnell |
| 5,879,191 A | 3/1999 | Burris |
| 5,882,226 A | 3/1999 | Bell et al. |
| 5,890,924 A * | 4/1999 | Endo .................. H01R 4/2433 439/404 |
| 5,897,795 A | 4/1999 | Lu et al. |
| 5,906,511 A | 5/1999 | Bozzer et al. |
| 5,917,153 A | 6/1999 | Geroldinger |
| 5,921,793 A | 7/1999 | Phillips |
| 5,938,465 A | 8/1999 | Fox, Sr. |
| 5,944,548 A | 8/1999 | Saito |
| 5,951,327 A | 9/1999 | Marik |
| 5,954,708 A | 9/1999 | Lopez et al. |
| 5,957,716 A | 9/1999 | Buckley et al. |
| 5,967,852 A | 10/1999 | Follingstad et al. |
| 5,975,479 A | 11/1999 | Suter |
| 5,975,591 A | 11/1999 | Guest |
| 5,975,949 A | 11/1999 | Holliday et al. |
| 5,975,951 A | 11/1999 | Burris et al. |
| 5,977,841 A | 11/1999 | Lee et al. |
| 5,997,350 A | 12/1999 | Burris et al. |
| 6,010,349 A | 1/2000 | Porter, Jr. |
| 6,019,635 A | 2/2000 | Nelson |
| 6,022,237 A | 2/2000 | Esh |
| 6,032,358 A | 3/2000 | Wild |
| 6,036,540 A | 3/2000 | Beloritsky |
| 6,042,422 A | 3/2000 | Youtsey |
| 6,048,229 A | 4/2000 | Lazaro, Jr. |
| 6,053,743 A | 4/2000 | Mitchell et al. |
| 6,053,769 A | 4/2000 | Kubota et al. |
| 6,053,777 A | 4/2000 | Boyle |
| 6,062,607 A | 5/2000 | Bartholomew |
| 6,080,015 A | 6/2000 | Andreescu |
| 6,083,030 A | 7/2000 | Wright |
| 6,083,053 A | 7/2000 | Anderson, Jr. et al. |
| 6,089,903 A | 7/2000 | Stafford Gray et al. |
| 6,089,912 A | 7/2000 | Tallis et al. |
| 6,089,913 A | 7/2000 | Holliday |
| 6,093,043 A | 7/2000 | Gray et al. |
| 6,095,828 A | 8/2000 | Burland |
| 6,095,841 A | 8/2000 | Felps |
| 6,123,550 A | 9/2000 | Burkert et al. |
| 6,123,567 A | 9/2000 | McCarthy |
| 6,126,487 A | 10/2000 | Rosenberger et al. |
| 6,132,234 A | 10/2000 | Waidner et al. |
| 6,142,812 A | 11/2000 | Hwang |
| 6,146,197 A | 11/2000 | Holliday et al. |
| 6,152,752 A | 11/2000 | Fukuda |
| 6,152,753 A | 11/2000 | Johnson et al. |
| 6,153,830 A | 11/2000 | Montena |
| 6,162,995 A | 12/2000 | Bachle et al. |
| 6,164,977 A | 12/2000 | Lester |
| 6,174,206 B1 | 1/2001 | Yentile et al. |
| 6,183,298 B1 | 2/2001 | Henningsen |
| 6,199,913 B1 | 3/2001 | Wang |
| 6,199,920 B1 | 3/2001 | Neustadtl |
| 6,210,216 B1 | 4/2001 | Tso-Chin et al. |
| 6,210,219 B1 | 4/2001 | Zhu et al. |
| 6,210,222 B1 | 4/2001 | Langham et al. |
| 6,217,383 B1 | 4/2001 | Holland et al. |
| 6,238,240 B1 | 5/2001 | Yu |
| 6,239,359 B1 | 5/2001 | Lilienthal, II et al. |
| 6,241,553 B1 | 6/2001 | Hsia |
| 6,250,942 B1 | 6/2001 | Lemke et al. |
| 6,250,974 B1 | 6/2001 | Kerek |
| 6,257,923 B1 | 7/2001 | Stone et al. |
| 6,261,126 B1 | 7/2001 | Stirling |
| 6,267,612 B1 | 7/2001 | Areykiewicz et al. |
| 6,271,464 B1 | 8/2001 | Cunningham |
| 6,299,475 B1 | 10/2001 | Huspeni et al. |
| 6,331,123 B1 | 12/2001 | Rodrigues |
| 6,332,815 B1 | 12/2001 | Bruce |
| 6,352,448 B1 | 3/2002 | Holliday et al. |
| 6,358,077 B1 | 3/2002 | Young |
| 6,361,348 B1 | 3/2002 | Hall et al. |
| 6,361,364 B1 | 3/2002 | Holland et al. |
| 6,375,509 B2 | 4/2002 | Mountford |
| 6,379,183 B1 | 4/2002 | Ayres et al. |
| 6,394,840 B1 | 5/2002 | Gassauer et al. |
| 6,396,367 B1 | 5/2002 | Rosenberger |
| D458,904 S | 6/2002 | Montena |
| 6,398,571 B1 | 6/2002 | Nishide et al. ............ 439/275 |
| 6,406,330 B2 | 6/2002 | Bruce |
| 6,409,534 B1 | 6/2002 | Weisz-Margulescu |
| D460,739 S | 7/2002 | Fox |
| D460,740 S | 7/2002 | Montena |
| D460,946 S | 7/2002 | Montena |
| D460,947 S | 7/2002 | Montena |
| D460,948 S | 7/2002 | Montena |
| 6,422,884 B1 | 7/2002 | Babasick et al. |
| 6,422,900 B1 | 7/2002 | Hogan |
| 6,425,782 B1 | 7/2002 | Holland |
| D461,166 S | 8/2002 | Montena |
| D461,167 S | 8/2002 | Montena |
| D461,778 S | 8/2002 | Fox |
| D462,058 S | 8/2002 | Montena |
| D462,060 S | 8/2002 | Fox |
| 6,439,899 B1 | 8/2002 | Muzslay et al. |
| D462,327 S | 9/2002 | Montena |
| 6,443,763 B1 | 9/2002 | Richet |
| 6,450,829 B1 | 9/2002 | Weisz-Margulescu |
| 6,454,463 B1 | 9/2002 | Halbach |
| 6,464,526 B1 | 10/2002 | Seufert et al. |
| 6,464,527 B2 | 10/2002 | Volpe et al. |
| 6,467,816 B1 | 10/2002 | Huang |
| 6,468,100 B1 | 10/2002 | Meyer et al. |
| 6,468,103 B1 | 10/2002 | Brower |
| 6,491,546 B1 | 12/2002 | Perry |
| D468,696 S | 1/2003 | Montena |
| 6,506,083 B1 | 1/2003 | Bickford et al. |
| 6,510,610 B2 | 1/2003 | Losinger |

(56) References Cited

U.S. PATENT DOCUMENTS

| | | | |
|---|---|---|---|
| 6,520,800 B1 | 2/2003 | Michelbach et al. |
| 6,530,807 B2 | 3/2003 | Rodrigues et al. |
| 6,540,531 B2 | 4/2003 | Syed et al. |
| 6,558,194 B2 | 5/2003 | Montena |
| 6,572,419 B2 | 6/2003 | Feye-Homann |
| 6,576,833 B2 | 6/2003 | Covaro et al. |
| 6,619,876 B2 | 9/2003 | Vaitkus et al. |
| 6,634,906 B1 | 10/2003 | Yeh |
| 6,637,101 B2 | 10/2003 | Hathaway et al. |
| 6,645,011 B2 | 11/2003 | Schneider et al. |
| 6,663,397 B1 | 12/2003 | Lin et al. |
| 6,676,446 B2 | 1/2004 | Montena |
| 6,683,253 B1 | 1/2004 | Lee |
| 6,683,773 B2 | 1/2004 | Montena |
| 6,692,285 B2 | 2/2004 | Islam |
| 6,692,286 B1 | 2/2004 | De Cet |
| 6,695,636 B2 | 2/2004 | Hall et al. |
| 6,705,875 B2 | 3/2004 | Berghorn et al. |
| 6,705,884 B1 | 3/2004 | McCarthy |
| 6,709,280 B1 | 3/2004 | Gretz |
| 6,709,289 B2 | 3/2004 | Huber et al. |
| 6,712,631 B1 | 3/2004 | Youtsey |
| 6,716,041 B2 | 4/2004 | Ferderer et al. |
| 6,716,062 B1 | 4/2004 | Palinkas et al. |
| 6,733,336 B1 | 5/2004 | Montena et al. |
| 6,733,337 B2 | 5/2004 | Kodaira |
| 6,743,040 B1 | 6/2004 | Nakamura |
| 6,749,454 B2 | 6/2004 | Schmidt et al. |
| 6,751,081 B1 | 6/2004 | Kooiman |
| 6,752,633 B2 | 6/2004 | Aizawa et al. |
| 6,761,571 B2 | 7/2004 | Hida |
| 6,767,248 B1 | 7/2004 | Hung |
| 6,769,926 B1 | 8/2004 | Montena |
| 6,780,029 B1 | 8/2004 | Gretz |
| 6,780,042 B1 | 8/2004 | Badescu et al. |
| 6,780,052 B2 | 8/2004 | Montena et al. |
| 6,780,068 B2 | 8/2004 | Bartholoma et al. |
| 6,783,394 B1 | 8/2004 | Holliday |
| 6,786,767 B1 | 9/2004 | Fuks et al. |
| 6,790,081 B2 | 9/2004 | Burris et al. |
| 6,793,528 B2 | 9/2004 | Lin et al. |
| 6,796,847 B2 * | 9/2004 | AbuGhazaleh ...... H05K 1/0228 439/676 |
| 6,802,738 B1 | 10/2004 | Henningsen |
| 6,805,581 B2 | 10/2004 | Chen |
| 6,805,583 B2 | 10/2004 | Holliday et al. |
| 6,805,584 B1 | 10/2004 | Chen |
| 6,808,415 B1 | 10/2004 | Montena |
| 6,817,272 B2 | 11/2004 | Holland |
| 6,817,896 B2 | 11/2004 | Derenthal |
| 6,817,897 B2 | 11/2004 | Chee |
| 6,827,608 B2 | 12/2004 | Hall et al. |
| 6,830,479 B2 | 12/2004 | Holliday |
| 6,848,115 B2 | 1/2005 | Sugiura et al. |
| 6,848,939 B2 | 2/2005 | Stirling |
| 6,848,940 B2 | 2/2005 | Montena |
| 6,848,941 B2 | 2/2005 | Wlos et al. |
| 6,884,113 B1 | 4/2005 | Montena |
| 6,884,115 B2 | 4/2005 | Malloy |
| 6,887,102 B1 | 5/2005 | Burris et al. |
| 6,916,200 B2 | 7/2005 | Burris et al. |
| 6,929,265 B2 | 8/2005 | Holland et al. |
| 6,929,508 B1 | 8/2005 | Holland |
| 6,935,866 B2 | 8/2005 | Kerekes et al. |
| 6,939,169 B2 | 9/2005 | Islam et al. |
| 6,942,516 B2 | 9/2005 | Shimoyama et al. |
| 6,942,520 B2 | 9/2005 | Barlian et al. |
| 6,945,805 B1 | 9/2005 | Bollinger |
| 6,948,976 B2 | 9/2005 | Goodwin et al. |
| 6,953,371 B2 | 10/2005 | Baker et al. |
| 6,955,563 B1 | 10/2005 | Croan |
| D511,497 S | 11/2005 | Murphy et al. |
| D512,024 S | 11/2005 | Murphy et al. |
| D512,689 S | 12/2005 | Murphy et al. |
| 6,971,912 B2 | 12/2005 | Montena et al. |
| 7,008,263 B2 | 3/2006 | Holland |
| 7,018,216 B1 | 3/2006 | Clark et al. |
| 7,018,235 B1 | 3/2006 | Burris et al. |
| 7,029,326 B2 | 4/2006 | Montena |
| D521,454 S | 5/2006 | Murphy et al. |
| 7,063,565 B2 | 6/2006 | Ward |
| 7,070,447 B2 | 7/2006 | Montena |
| 7,077,697 B2 | 7/2006 | Kooiman |
| 7,077,699 B2 | 7/2006 | Islam et al. |
| 7,086,897 B2 | 8/2006 | Montena |
| 7,090,525 B1 | 8/2006 | Morana |
| 7,094,114 B2 | 8/2006 | Kurimoto |
| 7,097,499 B1 | 8/2006 | Purdy |
| 7,102,868 B2 | 9/2006 | Montena |
| 7,108,547 B2 | 9/2006 | Kisling et al. |
| 7,108,548 B2 | 9/2006 | Burris et al. |
| 7,112,078 B2 | 9/2006 | Czikora |
| 7,112,093 B1 | 9/2006 | Holland |
| 7,114,990 B2 | 10/2006 | Bence et al. |
| 7,118,285 B2 | 10/2006 | Fenwick et al. |
| 7,118,382 B2 | 10/2006 | Kerekes et al. |
| 7,118,416 B2 | 10/2006 | Montena et al. |
| 7,125,283 B1 | 10/2006 | Lin |
| 7,128,603 B2 | 10/2006 | Burris et al. |
| 7,128,604 B2 | 10/2006 | Hall |
| 7,131,867 B1 | 11/2006 | Foster et al. |
| 7,131,868 B2 | 11/2006 | Montena |
| 7,140,645 B2 | 11/2006 | Cronley |
| 7,144,271 B1 | 12/2006 | Burris et al. |
| 7,144,272 B1 | 12/2006 | Burris et al. |
| 7,147,509 B1 | 12/2006 | Burris et al. |
| 7,153,159 B2 | 12/2006 | Burris et al. |
| 7,156,696 B1 | 1/2007 | Montena |
| 7,161,785 B2 | 1/2007 | Chawgo |
| 7,165,974 B2 | 1/2007 | Kooiman |
| 7,168,992 B2 | 1/2007 | Vo et al. |
| 7,173,121 B2 | 2/2007 | Fang |
| 7,179,121 B1 | 2/2007 | Burris et al. |
| 7,179,122 B2 | 2/2007 | Holliday |
| 7,182,639 B2 | 2/2007 | Burris |
| 7,183,639 B2 | 2/2007 | Mihara et al. |
| 7,189,097 B2 | 3/2007 | Benham |
| 7,189,114 B1 | 3/2007 | Burris et al. |
| 7,192,308 B2 | 3/2007 | Rodrigues et al. |
| 7,229,303 B2 | 6/2007 | Vermoesen et al. |
| 7,238,047 B2 | 7/2007 | Saetele et al. |
| 7,252,536 B2 | 8/2007 | Lazaro, Jr. et al. |
| 7,252,546 B1 | 8/2007 | Holland |
| 7,255,598 B2 | 8/2007 | Montena et al. |
| 7,261,594 B2 | 8/2007 | Kodama et al. |
| 7,264,502 B2 | 9/2007 | Holland |
| 7,278,882 B1 | 10/2007 | Li |
| 7,288,002 B2 | 10/2007 | Rodrigues et al. |
| 7,291,033 B2 | 11/2007 | Hu |
| 7,297,023 B2 | 11/2007 | Chawgo |
| 7,299,550 B2 | 11/2007 | Montena |
| 7,303,435 B2 | 12/2007 | Burris et al. |
| 7,311,555 B1 | 12/2007 | Burris et al. |
| 7,318,609 B2 | 1/2008 | Naito et al. |
| 7,322,846 B2 | 1/2008 | Camelio |
| 7,322,851 B2 | 1/2008 | Brookmire |
| 7,329,139 B2 | 2/2008 | Benham |
| 7,331,820 B2 | 2/2008 | Burris et al. |
| 7,335,058 B1 | 2/2008 | Burris et al. |
| 7,347,129 B1 | 3/2008 | Youtsey |
| 7,347,726 B2 | 3/2008 | Wlos |
| 7,347,727 B2 | 3/2008 | Wlos et al. |
| 7,347,729 B2 | 3/2008 | Thomas et al. |
| 7,351,088 B1 | 4/2008 | Qu |
| 7,357,641 B2 | 4/2008 | Kerekes et al. |
| 7,364,462 B2 | 4/2008 | Holland |
| 7,371,112 B2 | 5/2008 | Burris et al. |
| 7,371,113 B2 | 5/2008 | Burris et al. |
| 7,375,533 B2 | 5/2008 | Gale |
| 7,387,524 B2 | 6/2008 | Cheng |
| 7,393,245 B2 | 7/2008 | Palinkas et al. |
| 7,396,249 B2 | 7/2008 | Kauffman |
| 7,404,737 B1 | 7/2008 | Youtsey |
| 7,410,389 B2 | 8/2008 | Holliday |

(56) References Cited

U.S. PATENT DOCUMENTS

| | | |
|---|---|---|
| 7,416,415 B2 | 8/2008 | Hart et al. |
| 7,438,327 B2 | 10/2008 | Auray et al. |
| 7,452,239 B2 | 11/2008 | Montena |
| 7,455,550 B1 | 11/2008 | Sykes |
| 7,458,850 B1 | 12/2008 | Burris et al. |
| 7,458,851 B2 | 12/2008 | Montena |
| 7,462,068 B2 | 12/2008 | Amidon |
| 7,467,980 B2 | 12/2008 | Chiu |
| 7,476,127 B1 | 1/2009 | Wei |
| 7,478,475 B2 | 1/2009 | Hall |
| 7,479,033 B1 | 1/2009 | Sykes et al. |
| 7,479,035 B2 | 1/2009 | Bence et al. |
| 7,484,988 B2 | 2/2009 | Ma et al. |
| 7,484,997 B2 | 2/2009 | Hofling |
| 7,488,210 B1 | 2/2009 | Burris et al. |
| 7,494,355 B2 | 2/2009 | Hughes et al. |
| 7,497,729 B1 | 3/2009 | Wei |
| 7,500,868 B2 | 3/2009 | Holland et al. |
| 7,500,873 B1 | 3/2009 | Hart |
| 7,507,116 B2 | 3/2009 | Laerke et al. |
| 7,507,117 B2 | 3/2009 | Amidon |
| 7,513,788 B2 | 4/2009 | Camelio |
| 7,537,482 B2 | 5/2009 | Burris et al. |
| 7,540,759 B2 | 6/2009 | Liu et al. |
| 7,544,094 B1 | 6/2009 | Paglia et al. |
| 7,563,133 B2 | 7/2009 | Stein |
| 7,566,236 B2 | 7/2009 | Malloy et al. |
| 7,568,945 B2 | 8/2009 | Chee et al. |
| 7,578,693 B2 | 8/2009 | Yoshida et al. |
| 7,588,454 B2 | 9/2009 | Nakata et al. |
| 7,607,942 B1 | 10/2009 | Van Swearingen |
| 7,625,227 B1 | 12/2009 | Henderson et al. |
| 7,632,143 B1 | 12/2009 | Islam |
| 7,635,283 B1 | 12/2009 | Islam |
| 7,648,393 B2 | 1/2010 | Burris et al. |
| 7,651,376 B2 | 1/2010 | Schreier |
| 7,674,132 B1 | 3/2010 | Chen |
| 7,682,177 B2 | 3/2010 | Berthet |
| 7,694,420 B2 | 4/2010 | Ehret et al. |
| 7,714,229 B2 | 5/2010 | Burris et al. |
| 7,726,996 B2 | 6/2010 | Burris et al. |
| 7,727,011 B2 | 6/2010 | Montena et al. |
| 7,749,021 B2 | 7/2010 | Brodeur |
| 7,753,705 B2 | 7/2010 | Montena |
| 7,753,710 B2 | 7/2010 | George |
| 7,753,727 B1 | 7/2010 | Islam et al. |
| 7,758,356 B2 | 7/2010 | Burris et al. |
| 7,758,370 B1 | 7/2010 | Flaherty |
| 7,794,275 B2 | 9/2010 | Rodrigues |
| 7,806,714 B2 | 10/2010 | Williams et al. |
| 7,806,725 B1 | 10/2010 | Chen |
| 7,811,133 B2 | 10/2010 | Gray |
| 7,814,654 B2 | 10/2010 | Pichler |
| D626,920 S | 11/2010 | Purdy et al. |
| 7,824,216 B2 | 11/2010 | Purdy |
| 7,828,594 B2 | 11/2010 | Burris et al. |
| 7,828,595 B2 | 11/2010 | Mathews |
| 7,830,154 B2 | 11/2010 | Gale |
| 7,833,053 B2 | 11/2010 | Mathews |
| 7,845,976 B2 | 12/2010 | Mathews |
| 7,845,978 B1 | 12/2010 | Chen |
| 7,845,980 B1 | 12/2010 | Amidon |
| 7,850,472 B2 | 12/2010 | Friedrich et al. |
| 7,850,487 B2 | 12/2010 | Wei |
| 7,857,661 B1 | 12/2010 | Islam |
| 7,874,870 B1 | 1/2011 | Chen |
| 7,887,354 B2 | 2/2011 | Holliday |
| 7,892,004 B2 | 2/2011 | Hertzler et al. |
| 7,892,005 B2 | 2/2011 | Haube |
| 7,892,024 B1 | 2/2011 | Chen |
| 7,914,326 B2 | 3/2011 | Sutter |
| 7,918,687 B2 | 4/2011 | Paynter et al. |
| 7,927,135 B1 | 4/2011 | Wlos |
| 7,934,955 B1 | 5/2011 | Hsia |
| 7,938,662 B2 | 5/2011 | Burris et al. |
| 7,942,695 B1 | 5/2011 | Lu |
| 7,950,958 B2 | 5/2011 | Mathews |
| 7,950,961 B2 | 5/2011 | Chabalowski et al. |
| 7,955,126 B2 | 6/2011 | Bence et al. |
| 7,972,158 B2 | 7/2011 | Wild et al. |
| 7,972,176 B2 | 7/2011 | Burris et al. |
| 7,982,005 B2 | 7/2011 | Ames et al. |
| 8,011,955 B1 | 9/2011 | Lu |
| 8,025,518 B2 | 9/2011 | Burris et al. |
| 8,029,315 B2 | 10/2011 | Purdy et al. |
| 8,029,316 B2 | 10/2011 | Snyder et al. |
| 8,037,599 B2 | 10/2011 | Pichler |
| 8,047,872 B2 | 11/2011 | Burris et al. |
| 8,062,044 B2 | 11/2011 | Montena et al. |
| 8,062,063 B2 | 11/2011 | Malloy et al. |
| 8,070,504 B2 | 12/2011 | Amidon et al. |
| 8,075,337 B2 | 12/2011 | Malloy et al. |
| 8,075,338 B1 | 12/2011 | Montena |
| 8,079,860 B1 | 12/2011 | Zraik |
| 8,087,954 B2 | 1/2012 | Fuchs |
| 8,113,875 B2 | 2/2012 | Malloy et al. |
| 8,113,879 B1 | 2/2012 | Zraik |
| 8,157,587 B2 | 4/2012 | Paynter et al. |
| 8,157,588 B1 | 4/2012 | Rodrigues et al. |
| 8,167,635 B1 | 5/2012 | Mathews |
| 8,167,636 B1 | 5/2012 | Montena |
| 8,172,612 B2 | 5/2012 | Bence et al. |
| 8,177,572 B2 | 5/2012 | Feye-Hohmann |
| 8,192,237 B2 | 6/2012 | Purdy et al. |
| 8,206,172 B2 | 6/2012 | Katagiri et al. |
| D662,893 S | 7/2012 | Haberek et al. |
| 8,231,412 B2 | 7/2012 | Paglia et al. |
| 8,262,408 B1 | 9/2012 | Kelly |
| 8,272,893 B2 | 9/2012 | Burris et al. |
| 8,287,310 B2 | 10/2012 | Burris et al. |
| 8,287,320 B2 | 10/2012 | Purdy et al. |
| 8,313,345 B2 | 11/2012 | Purdy |
| 8,313,353 B2 | 11/2012 | Purdy et al. |
| 8,317,539 B2 | 11/2012 | Stein |
| 8,319,136 B2 | 11/2012 | Byron et al. |
| 8,323,053 B2 | 12/2012 | Montena |
| 8,323,058 B2 | 12/2012 | Flaherty et al. |
| 8,323,060 B2 | 12/2012 | Purdy et al. |
| 8,337,229 B2 | 12/2012 | Montena |
| 8,366,481 B2 | 2/2013 | Ehret et al. |
| 8,366,482 B2 | 2/2013 | Burris et al. |
| 8,376,769 B2 | 2/2013 | Holland et al. |
| D678,844 S | 3/2013 | Haberek |
| 8,398,421 B2 | 3/2013 | Haberek et al. |
| 8,430,688 B2 | 4/2013 | Montena et al. |
| 8,449,326 B2 | 5/2013 | Holland et al. |
| 8,465,322 B2 | 6/2013 | Purdy |
| 8,469,739 B2 | 6/2013 | Rodrigues et al. |
| 8,469,740 B2 | 6/2013 | Ehret et al. |
| D686,164 S | 7/2013 | Haberek et al. |
| D686,576 S | 7/2013 | Haberek et al. |
| 8,475,205 B2 | 7/2013 | Ehret et al. |
| 8,480,430 B2 | 7/2013 | Ehret et al. |
| 8,480,431 B2 | 7/2013 | Ehret et al. |
| 8,485,845 B2 | 7/2013 | Ehret et al. |
| 8,506,325 B2 | 8/2013 | Malloy et al. |
| 8,517,763 B2 | 8/2013 | Burris et al. |
| 8,517,764 B2 | 8/2013 | Wei et al. |
| 8,529,279 B2 | 9/2013 | Montena |
| 8,550,835 B2 | 10/2013 | Montena |
| 8,568,163 B2 | 10/2013 | Burris et al. |
| 8,568,165 B2 | 10/2013 | Wei et al. |
| 8,591,244 B2 | 11/2013 | Thomas et al. |
| 8,597,050 B2 | 12/2013 | Flaherty et al. |
| 8,622,776 B2 * | 1/2014 | Morikawa ............ H01R 4/185 439/883 |
| 8,636,529 B2 | 1/2014 | Stein |
| 8,636,541 B2 | 1/2014 | Chastain et al. |
| 8,647,136 B2 | 2/2014 | Purdy et al. |
| 7,114,990 C1 | 4/2014 | Bence et al. |
| 8,690,603 B2 | 4/2014 | Bence et al. |
| 8,721,365 B2 | 5/2014 | Holland |
| 8,727,800 B2 | 5/2014 | Holland et al. |
| 8,758,050 B2 | 6/2014 | Montena |

(56) References Cited

U.S. PATENT DOCUMENTS

| | | |
|---|---|---|
| 8,777,658 B2 | 7/2014 | Holland et al. |
| 8,777,661 B2 | 7/2014 | Holland et al. |
| 8,172,612 C1 | 9/2014 | Bence et al. |
| 8,858,251 B2 | 10/2014 | Montena |
| 8,888,526 B2 | 11/2014 | Burris |
| 8,920,192 B2 | 12/2014 | Montena |
| 6,558,194 C1 | 1/2015 | Montena |
| 6,848,940 C1 | 1/2015 | Montena |
| 9,017,101 B2 | 4/2015 | Ehret et al. |
| 9,048,599 B2 | 6/2015 | Burris |
| 9,153,911 B2 | 10/2015 | Burris et al. |
| 9,166,348 B2 | 10/2015 | Burris et al. |
| 9,172,154 B2 | 10/2015 | Burris |
| 9,172,157 B2 | 10/2015 | Burris |
| 2001/0034143 A1 | 10/2001 | Annequin |
| 2001/0046802 A1 | 11/2001 | Perry et al. |
| 2001/0051448 A1 | 12/2001 | Gonzalez |
| 2002/0013088 A1 | 1/2002 | Rodrigues et al. |
| 2002/0019161 A1 | 2/2002 | Finke et al. |
| 2002/0038720 A1 | 4/2002 | Kai et al. |
| 2002/0146935 A1 | 10/2002 | Wong |
| 2003/0110977 A1 | 6/2003 | Batlaw |
| 2003/0119358 A1 | 6/2003 | Henningsen |
| 2003/0139081 A1 | 7/2003 | Hall et al. |
| 2003/0194890 A1 | 10/2003 | Ferderer et al. |
| 2003/0214370 A1 | 11/2003 | Allison et al. |
| 2003/0224657 A1 | 12/2003 | Malloy |
| 2004/0031144 A1 | 2/2004 | Holland |
| 2004/0077215 A1 | 4/2004 | Palinkas et al. |
| 2004/0102089 A1 | 5/2004 | Chee |
| 2004/0137778 A1 | 7/2004 | Mattheeuws et al. |
| 2004/0157499 A1 | 8/2004 | Nania et al. |
| 2004/0194585 A1 | 10/2004 | Clark |
| 2004/0209516 A1 | 10/2004 | Burris et al. |
| 2004/0219833 A1 | 11/2004 | Burris et al. |
| 2004/0229504 A1 | 11/2004 | Liu |
| 2005/0042919 A1 | 2/2005 | Montena |
| 2005/0079762 A1 | 4/2005 | Hsia |
| 2005/0159045 A1 | 7/2005 | Huang |
| 2005/0170692 A1 | 8/2005 | Montena |
| 2005/0181652 A1 | 8/2005 | Montena et al. |
| 2005/0181668 A1 | 8/2005 | Montena et al. |
| 2005/0208827 A1 | 9/2005 | Burris et al. |
| 2005/0233636 A1 | 10/2005 | Rodrigues et al. |
| 2006/0014425 A1 | 1/2006 | Montena |
| 2006/0099853 A1 | 5/2006 | Sattele et al. |
| 2006/0110977 A1 | 5/2006 | Matthews |
| 2006/0113107 A1 | 6/2006 | Williams |
| 2006/0154519 A1 | 7/2006 | Montena |
| 2006/0166552 A1 | 7/2006 | Bence et al. |
| 2006/0178034 A1 | 8/2006 | Shimirak |
| 2006/0178046 A1 | 8/2006 | Tusini |
| 2006/0194465 A1 | 8/2006 | Czikora |
| 2006/0199040 A1* | 9/2006 | Yamada .................. C03C 1/006 428/701 |
| 2006/0223355 A1 | 10/2006 | Hirschmann |
| 2006/0246774 A1 | 11/2006 | Buck |
| 2006/0258209 A1 | 11/2006 | Hall |
| 2006/0276079 A1 | 12/2006 | Chen |
| 2007/0004276 A1 | 1/2007 | Stein |
| 2007/0026734 A1 | 2/2007 | Bence et al. |
| 2007/0049113 A1 | 3/2007 | Rodrigues et al. |
| 2007/0054535 A1 | 3/2007 | Hall et al. |
| 2007/0059968 A1 | 3/2007 | Ohtaka et al. |
| 2007/0082533 A1 | 4/2007 | Currier et al. |
| 2007/0087613 A1 | 4/2007 | Schumacher et al. |
| 2007/0123101 A1 | 5/2007 | Palinkas |
| 2007/0155232 A1 | 7/2007 | Burris et al. |
| 2007/0173100 A1 | 7/2007 | Benham |
| 2007/0175027 A1 | 8/2007 | Khemakhem et al. |
| 2007/0232117 A1 | 10/2007 | Singer |
| 2007/0243759 A1 | 10/2007 | Rodrigues et al. |
| 2007/0243762 A1 | 10/2007 | Burke et al. |
| 2007/0287328 A1 | 12/2007 | Hart et al. |
| 2008/0032556 A1 | 2/2008 | Schreier |
| 2008/0102696 A1 | 5/2008 | Montena |
| 2008/0171466 A1 | 7/2008 | Buck et al. |
| 2008/0200066 A1 | 8/2008 | Hofling |
| 2008/0200068 A1 | 8/2008 | Aguirre |
| 2008/0214040 A1 | 9/2008 | Holterhoff et al. |
| 2008/0289470 A1 | 11/2008 | Aston |
| 2008/0310026 A1* | 12/2008 | Nakayama .............. C03C 1/006 359/586 |
| 2009/0029590 A1 | 1/2009 | Sykes et al. |
| 2009/0098770 A1 | 4/2009 | Bence et al. |
| 2009/0104801 A1 | 4/2009 | Silva |
| 2009/0163075 A1 | 6/2009 | Blew et al. |
| 2009/0186505 A1 | 7/2009 | Mathews |
| 2009/0264003 A1 | 10/2009 | Hertzler et al. |
| 2009/0305560 A1 | 12/2009 | Chen |
| 2010/0007441 A1 | 1/2010 | Yagisawa et al. |
| 2010/0022125 A1 | 1/2010 | Burris et al. |
| 2010/0028563 A1 | 2/2010 | Ota |
| 2010/0055978 A1 | 3/2010 | Montena |
| 2010/0080563 A1 | 4/2010 | DiFonzo et al. |
| 2010/0081321 A1 | 4/2010 | Malloy et al. |
| 2010/0081322 A1 | 4/2010 | Malloy et al. |
| 2010/0087071 A1 | 4/2010 | DiFonzo et al. |
| 2010/0105246 A1 | 4/2010 | Burris et al. |
| 2010/0124839 A1 | 5/2010 | Montena |
| 2010/0130060 A1 | 5/2010 | Islam |
| 2010/0178799 A1 | 7/2010 | Lee |
| 2010/0216339 A1 | 8/2010 | Burris et al. |
| 2010/0233901 A1 | 9/2010 | Wild et al. |
| 2010/0233902 A1 | 9/2010 | Youtsey |
| 2010/0233903 A1 | 9/2010 | Islam |
| 2010/0255719 A1 | 10/2010 | Purdy |
| 2010/0255721 A1 | 10/2010 | Purdy et al. |
| 2010/0279548 A1 | 11/2010 | Montena et al. |
| 2010/0297871 A1 | 11/2010 | Haube |
| 2010/0297875 A1 | 11/2010 | Purdy et al. |
| 2010/0304579 A1 | 12/2010 | Kisling |
| 2010/0323541 A1 | 12/2010 | Amidon et al. |
| 2011/0021072 A1 | 1/2011 | Purdy |
| 2011/0021075 A1 | 1/2011 | Orner et al. |
| 2011/0027039 A1 | 2/2011 | Blair |
| 2011/0039448 A1 | 2/2011 | Stein |
| 2011/0053413 A1 | 3/2011 | Mathews |
| 2011/0074388 A1 | 3/2011 | Bowman |
| 2011/0080158 A1 | 4/2011 | Lawrence et al. |
| 2011/0111623 A1 | 5/2011 | Burris et al. |
| 2011/0111626 A1 | 5/2011 | Paglia et al. |
| 2011/0117774 A1 | 5/2011 | Malloy et al. |
| 2011/0143567 A1 | 6/2011 | Purdy et al. |
| 2011/0151714 A1 | 6/2011 | Flaherty et al. |
| 2011/0230089 A1 | 9/2011 | Amidon et al. |
| 2011/0230091 A1 | 9/2011 | Krenceski et al. |
| 2011/0237123 A1 | 9/2011 | Burris et al. |
| 2011/0237124 A1 | 9/2011 | Flaherty et al. |
| 2011/0250789 A1 | 10/2011 | Burris et al. |
| 2011/0318958 A1 | 12/2011 | Burris et al. |
| 2012/0021642 A1 | 1/2012 | Zraik |
| 2012/0040537 A1 | 2/2012 | Burris |
| 2012/0045933 A1 | 2/2012 | Youtsey |
| 2012/0064768 A1 | 3/2012 | Islam et al. |
| 2012/0094530 A1 | 4/2012 | Montena |
| 2012/0100751 A1 | 4/2012 | Montena |
| 2012/0108098 A1 | 5/2012 | Burris et al. |
| 2012/0122329 A1 | 5/2012 | Montena |
| 2012/0129387 A1 | 5/2012 | Holland et al. |
| 2012/0171894 A1 | 7/2012 | Malloy et al. |
| 2012/0178289 A1 | 7/2012 | Holliday |
| 2012/0202378 A1 | 8/2012 | Krenceski et al. |
| 2012/0222302 A1 | 9/2012 | Purdy et al. |
| 2012/0225581 A1 | 9/2012 | Amidon et al. |
| 2012/0315788 A1 | 12/2012 | Montena |
| 2013/0065433 A1 | 3/2013 | Burris |
| 2013/0072057 A1 | 3/2013 | Burris |
| 2013/0178096 A1 | 7/2013 | Matzen |
| 2013/0273761 A1 | 10/2013 | Ehret et al. |
| 2014/0106612 A1 | 4/2014 | Burris |
| 2014/0106613 A1 | 4/2014 | Burris |
| 2014/0120766 A1 | 5/2014 | Meister et al. |
| 2014/0137393 A1 | 5/2014 | Chastain et al. |

(56) References Cited

U.S. PATENT DOCUMENTS

| | | |
|---|---|---|
| 2014/0148044 A1 | 5/2014 | Balcer et al. |
| 2014/0148051 A1 | 5/2014 | Bence et al. |
| 2014/0154907 A1 | 6/2014 | Ehret et al. |
| 2014/0298650 A1 | 10/2014 | Chastain et al. |
| 2014/0322968 A1 | 10/2014 | Burris |
| 2014/0342605 A1 | 11/2014 | Burris et al. |
| 2015/0118901 A1 | 4/2015 | Burris |
| 2015/0295331 A1 | 10/2015 | Burris |

FOREIGN PATENT DOCUMENTS

| | | | |
|---|---|---|---|
| CN | 201149937 | 11/2008 | |
| CN | 201178228 | 1/2009 | |
| CN | 201904508 | 7/2011 | |
| DE | 47931 | 10/1888 | |
| DE | 102289 | 7/1897 | |
| DE | 1117687 | 11/1961 | |
| DE | 2261973 | 6/1974 | |
| DE | 3117320 | 4/1982 | |
| DE | 3211008 | 10/1983 | |
| DE | 9001608.4 | 4/1990 | |
| DE | 4439852 | 5/1996 | |
| DE | 19749130 | 8/1999 | |
| DE | 19957518 | 9/2001 | |
| DE | 10346914 | 5/2004 | |
| EP | 115179 | 8/1984 | |
| EP | 116157 | 8/1984 | |
| EP | 167738 | 1/1986 | |
| EP | 72104 | 2/1986 | |
| EP | 0223464 A2 | 5/1987 | |
| EP | 265276 | 4/1988 | |
| EP | 350835 | 1/1990 | |
| EP | 428424 | 5/1991 | |
| EP | 867978 | 9/1998 | |
| EP | 1069654 | 9/1998 | |
| EP | 1094565 | 4/2001 | |
| EP | 1115179 | 7/2001 | |
| EP | 1191268 | 3/2002 | |
| EP | 1455420 | 9/2004 | |
| EP | 1501159 | 1/2005 | |
| EP | 1548898 | 6/2005 | |
| EP | 1603200 | 12/2005 | |
| EP | 1701410 | 9/2006 | |
| EP | 2051340 | 4/2009 | |
| FR | 2204331 | 5/1974 | |
| FR | 2232846 | 1/1975 | |
| FR | 2462798 | 2/1981 | |
| FR | 2494508 | 5/1982 | |
| GB | 589697 | 6/1947 | |
| GB | 1087228 | 10/1967 | |
| GB | 1270846 | 4/1972 | |
| GB | 1332888 | 10/1973 | |
| GB | 1401373 | 7/1975 | |
| GB | 1421215 | 1/1976 | |
| GB | 2019665 | 10/1979 | |
| GB | 2079549 | 1/1982 | |
| GB | 2252677 | 8/1992 | |
| GB | 2264201 | 8/1993 | |
| GB | 2331634 | 5/1999 | |
| GB | 2448595 | 10/2008 | |
| GB | 2450248 | 12/2008 | |
| JP | 3280369 | 12/1991 | |
| JP | 200215823 | 1/2002 | |
| JP | 4129978 B2 | 8/2008 | G06K 17/00 |
| JP | 4219778 | 2/2009 | |
| JP | 2009277571 A | 11/2009 | H01R 4/70 |
| JP | 4391268 B2 | 12/2009 | H01R 13/52 |
| JP | 4503793 | 7/2010 | |
| KR | 100622526 | 9/2006 | |
| TW | 427044 | 3/2001 | |
| WO | 8700351 | 1/1987 | |
| WO | 00/05785 | 2/2000 | |
| WO | 0186756 | 11/2001 | |
| WO | 02069457 | 9/2002 | |
| WO | 2004013883 | 2/2004 | |
| WO | 2004098795 A1 | 11/2004 | |
| WO | 2006081141 | 8/2006 | |
| WO | 2007062845 | 6/2007 | |
| WO | 2009066705 | 5/2009 | |
| WO | 2010135181 | 11/2010 | |
| WO | 2011057033 | 5/2011 | |
| WO | 2012162431 | 5/2011 | |
| WO | 2011128665 | 10/2011 | |
| WO | 2011128666 | 10/2011 | |
| WO | 2013126629 | 8/2013 | |

OTHER PUBLICATIONS

Corning Gilbert 2004 OEM Coaxial Products Catalog, Quick Disconnects, 2 pages.
US Office Action, U.S. Appl. No. 10/997,218; Jul. 31, 2006, pp. 1-10.
Society of Cable Telecommunications Engineers, Engineering Committee, Interface Practices Subcommittee; American National Standard; ANSI/SCTE Jan. 2006; Specification for "F" Port, Female, Outdoor. Published Jan. 2006. 9 pages.
The American Society of Mechanical Engineers; "Lock Washers (Inch Series), An American National Standard"; ASME 818.21.1-1999 (Revision of ASME B18.21.1-1994); Reaffirmed 2005. Published Feb. 11, 2000. 28 pages.
Notice of Allowance (Mail Date Mar. 20, 2012) for U.S. Appl. No. 13/117,843.
Search Report dated Jun. 6, 2014 pertaining to International application No. PCT/US2014/023374.
Search Report dated Apr. 9, 2014 pertaining to International application No. PCT/US2014/015934.
Society of Cable Telecommunications Engineers, Engineering Committee, Interface Practices Subcommittee; American National Standard; ANSI/SCTE Feb. 2006; "Specification for "F" Port, Female, Indoor". Published Feb. 2006. 9 pages.
Patent Cooperation Treaty, International Search Report for PCT/US2013/070497, Feb. 11, 2014, 3 pgs.
Patent Cooperation Treaty, International Search Report for PCT/US2013/064515, 10 pgs.
Patent Cooperation Treaty, International Search Report for PCT/US2013/064512, Jan. 21, 2014, 11 pgs.
Huber+Suhner AG, RF Connector Guide: Understanding connector technology, 2007, Retrieved from http://www.ie.itcr.ac.cr/marin/lic/e14515/HUBER+SUENER_RF_Connector_Guide.pdf.
Slade, Paul G,. Electrical Contacts: Principles and Applications, 1999, Retrieved from http://books.google.com/books (table of contents only).
U.S. Reexamination Control No. 95/002,400 filed Sep. 15, 2012, regarding U.S. Pat. No. 8,192,237 filed Feb. 23, 2011 (Purdy et al.).
U.S. Inter Partes Review Case No. 2013-00346 filed Jun. 10, 2013, regarding U.S. Pat. No. 8,287,320 filed Dec. 8, 2009, claims 1-8, 10-16, 18-31 (Purdy et al.).
U.S. Inter Partes Review Case No. 2013-00343 filed Jun. 10, 2013, regarding U.S. Pat. No. 8,313,353 filed Apr. 30, 2012, claims 1-6 (Purdy et al.).
U.S. Inter Partes Review Case No. 2013-00340 filed Jun. 10, 2013, regarding U.S. Pat. No. 8,323,060 filed Jun. 14, claims 1-9 (Purdy et al.).
U.S. Inter Partes Review Case No. 2013-00347 filed Jun. 10, 2013, regarding U.S. Pat. No. 8,287,320 filed Dec. 8, 2009, claims 9, 17, 32 (Purdy et al.).
U.S. Inter Partes Review Case No. 2013-00345 filed Jun. 10, 2013, regarding U.S. Pat. No. 8,313,353 filed Apr. 30, 2012, claims 7-27 (Purdy et al.).
U.S. Inter Partes Review Case No. 2013-00342 filed Jun. 10, 2013, regarding U.S. Pat. No. 8,323,060 filed Jun. 14, 2012, claims 10-25 (Purdy et al.).
U.S. Inter Partes Review Case No. 2014-00441 filed Feb. 18, 2014, regarding U.S. Pat. No. 8,562,366 filed Oct. 15, 2012, claims 31,37, 39, 41, 42, 55 56 (Purdy et al.).
U.S. Inter Partes Review Case No. 2014-00440 filed Feb. 18, 2014, regarding U.S. Pat. No. 8,597,041 filed Oct. 15, 2012, claims 1, 8, 9, 11, 18-26, 29 (Purdy et al.).

(56) References Cited

OTHER PUBLICATIONS

Office Action dated Jun. 12, 2014 pertaining to U.S. Appl. No. 13/795,737.
Office Action dated Aug. 25, 2014 pertaining to U.S. Appl. No. 13/605,481.
Election/Restrictions Requirement dated Jul. 31, 2014 pertaining to U.S. Appl. No. 13/652,969.
Office Action dated Aug. 29, 2014 pertaining to U.S. Appl. No. 13/827,522.
Election/Restrictions Requirement dated Jun. 20, 2014 pertaining to U.S. Appl. No. 13/795,780.
Office Action dated Sep. 19, 2014 pertaining to U.S. Appl. No. 13/795,780.
Office Action dated Oct. 6, 2014 pertaining to U.S. Appl. No. 13/732,679.
Corning Cabelcon waterproof CX3 7.0 QuickMount for RG6 cables; Cabelcon Connectors; www.cabelcom.dk; Mar. 15, 2012.
Maury Jr., M.; Microwave Coaxial Connector Technology: A Continuaing Evolution; Maury Microwave Corporation; Dec. 13, 2005; pp. 1-21; Maury Microwave Inc.
"Snap-On/Push-On" SMA Adapter; RF TEC Mfg., Inc.; Mar. 23, 2006; 2 pgs.
RG6 quick mount data sheet; Corning Cabelcon; 2010; 1 pg.; Corning Cabelcon ApS.
RG11 quick mount data sheet; Corning Cabelcon; 2013; 1 pg.; Corning Cabelcon ApS.
Gilbert Engineering Co., Inc.; OEM Coaxial Connectors catalog; Aug. 1993; p. 26.
UltraEase Compression Connectors; "F" Series 59 and 6 Connectors Product Information; May 2005; 4 pgs.
Pomona Electronics Full Line Catelog; vol. 50; 2003; pp. 1-100.
Office Action dated Dec. 31, 2014 pertaining to U.S. Appl. No. 13/605,498.
Office Action dated Dec. 16, 2014 pertaining to U.S. Appl. No. 13/653,095.
Office Action dated Dec. 19, 2014 pertaining to U.S. Appl. No. 13/652,969.
Office Action dated Dec. 29, 2014 pertaining to U.S. Appl. No. 13/833,793.
Notice of Allowance dated Feb. 2, 2015 pertaining to U.S. Appl. No. 13/795,737.
Office Action dated Feb. 25, 2015 pertaining to U.S. Appl. No. 13/605,481.
Office Action dated Feb. 18, 2015 pertaining to U.S. Appl. No. 13/827,522.
Office Action dated Mar. 19, 2015 pertaining to U.S. Appl. No. 13/795,780.
Patent Cooperation Treaty, International Search Report for PCT/US2014/037841, Mail Date Aug. 19, 2014, 3 pages.
Office Action dated Jun. 24, 2015 pertaining to U.S. Appl. No. 13/652,969.
Patent Cooperation Treaty, International Preliminary Report on Patentability for PCT/US2013/064512, mail date Apr. 30, 2015, 9 pages.
Patent Cooperation Treaty, International Preliminary Report on Patentability for PCT/US2013/064515, mail date Apr. 30, 2015, 8 pages.
Office Action dated Jun. 24, 2015 pertaining to U.S. Appl. No. 14/259,703.
Office Action dated Jul. 20, 2015 pertaining to U.S. Appl. No. 14/279,870.
Office Action dated Feb. 2, 2016 pertaining to U.S. Appl. No. 14/259,703.
Office Action dated Mar. 10, 2016 pertaining to U.S. Appl. No. 14/166,653.

\* cited by examiner

CONNECTOR ASSEMBLIES AND METHODS OF MANUFACTURE

BACKGROUND

Field

The subject matter of the present disclosure generally relates to electrical connectors comprising insulation displacement members.

Technical Background

Electrical circuits, and in particular telecommunications networks, make extensive use of electrical connectors, sometimes referred to herein as connector assemblies, to quickly and easily establish electrical connections with insulated electrical conductors, such as insulated wires. For example, electrical connections need to be established between a service provider, such as a telephone company or an internet service provider, and the subscriber. In telecommunications networks, electrical connectors are typically disposed within wire termination devices, such as line modules, protected terminal devices, and station protectors, and establish the necessary electrical connections throughout the network.

Some electrical connectors utilize insulation displacement type connectors, which contain an insulation displacement member that serves to break through the insulation of an electrical conductor. In these types of connectors, the insulation on the electrical conductor may not need to be removed prior to connection between the electrical conductor and the electrical connector. For example, an insulation displacement member may cut through the insulation of the insulated electrical conductor, such as an insulated wire, to establish electrical continuity between the insulation displacement member and the electrical conductor.

BRIEF SUMMARY

The present inventors have recognized that insulation displacement members used in the above-described electrical connectors may be formed from materials that corrode or are otherwise damaged by environmental conditions over a period of time, especially if the electrical connector is utilized in an outdoor environment. For example, a copper insulation displacement member may corrode over time when exposed to moisture.

In accordance with one embodiment, a connector assembly may comprise a connector framework and at least one insulation displacement member. The connector framework may comprise an insulated-wire passage that is sized and oriented to receive an insulated electrically conductive wire. The insulation displacement member may comprise a conductive wire engaging portion and may be mechanically supported by the connector framework to permit forcible engagement of the wire engaging portion with the insulated electrically conductive wire. The insulation displacement member may define an electrically conductive path extending from the wire engaging portion to an electrical coupling node of the connector assembly. At least the wire engaging portion of the insulation displacement member may be coated with a cured hydrophobic organosilane mono-layer protective coating such that may seals the insulation displacement member from environmental moisture or otherwise protect the insulation displacement member from damage.

In accordance with another embodiment, a method to manufacture a connector assembly comprising an insulation displacement member comprising a hydrophobic organosilane mono-layer protective coating is disclosed. The connector assembly may be manufactured by a method that includes assembling the connector assembly, contacting the connector assembly with an organosilane coating solution, and curing the organosilane coating solution. The connector assembly may be assembled by mechanically supporting the insulation displacement member with a connector framework. The connector framework may comprise an insulated-wire passage that is sized and oriented to receive an insulated electrically conductive wire. The insulation displacement member may comprise a conductive wire engaging portion permitting forcible engagement of the wire engaging portion with the insulated electrically conductive wire when mechanically supported by the connector framework. The insulation displacement member may define an electrically conductive path extending from the wire engaging portion to an electrical coupling node of the connector assembly. The connector assembly may be contacted with the organosilane coating solution by contacting at least the wire engaging portion of the insulation displacement member and at least a portion of the connector assembly with the organosilane coating solution. The organosilane coating solution may be cured at a temperature of at least about 50° C.

In accordance with yet another embodiment, a method to manufacture a connector assembly comprising an insulation displacement member comprising a hydrophobic organosilane mono-layer protective coating is disclosed. The connector assembly may be manufactured by a method that includes contacting the insulation displacement member with an organosilane coating solution, curing the organosilane coating solution, and assembling the connector assembly. The insulation displacement member may be contacted with an organosilane coating solution contacting by contacting at least a wire engaging portion of the insulation displacement member with an organosilane coating solution. The organosilane coating solution may be cured at a temperature of at least about 50° C. to form an insulation displacement member comprising a hydrophobic organosilane mono-layer protective coating. The connector assembly may be assembled by mechanically supporting the insulation displacement member comprising the hydrophobic organosilane mono-layer protective coating with a connector framework. The connector framework may comprise an insulated-wire passage that is sized and oriented to receive an insulated electrically conductive wire. The insulation displacement member may comprise a conductive wire engaging portion permitting forcible engagement of the wire engaging portion with the insulated electrically conductive wire when mechanically supported by the connector framework. The insulation displacement member may be formed primarily of a material that is hydrophilic relative to a material of the connector framework and may define an electrically conductive path extending from the wire engaging portion to an electrical coupling node of the connector assembly.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

It is to be understood that both the foregoing general description and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and together with the description serve to explain the principles and operations of the technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Reference will now be made in greater detail to various embodiments, some embodiments of which are illustrated in the accompanying drawings. Whenever possible, the same reference numerals will be used throughout the drawings to refer to the same or similar parts. Generally, disclosed herein are various embodiments of connector assemblies and their methods of manufacture. A connector assembly may comprise a connector framework and at least one insulation displacement member. As described herein, at least a portion of the insulation displacement member may have a protective coating. In one embodiment, the protective coating is a cured hydrophobic organosilane mono-layer protective coating. The protective coating seals the insulation displacement member from environmental moisture or otherwise protects the insulation displacement member.

Figure 1:
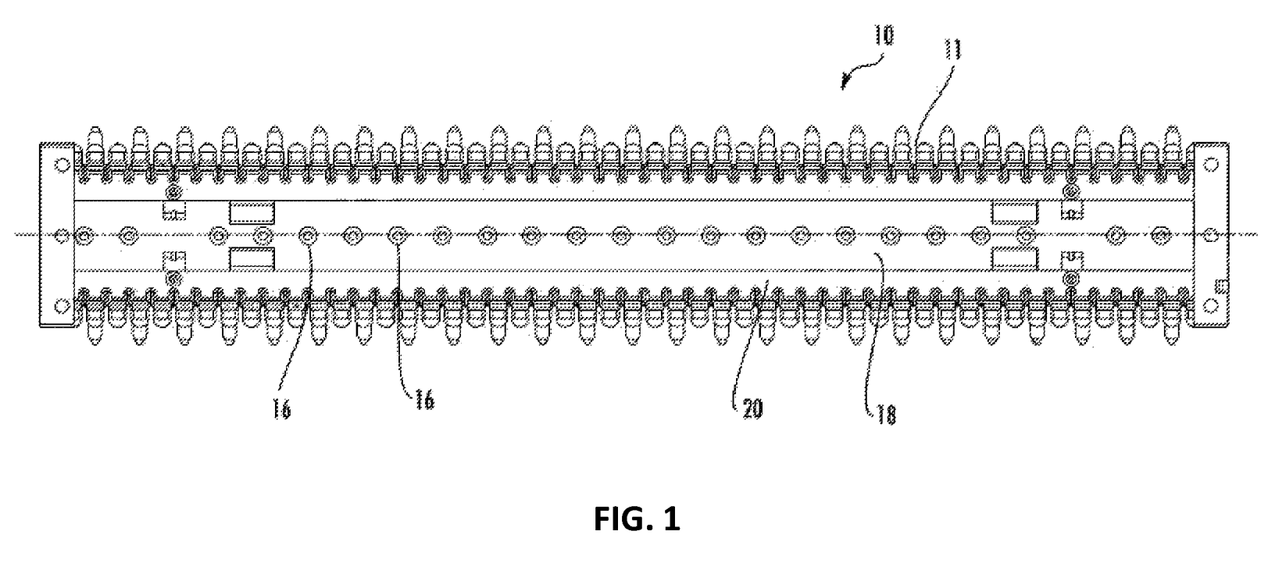
FIG. 1 schematically depicts a side view of a connector assembly, according to one or more embodiments disclosed herein.
Figure 2:
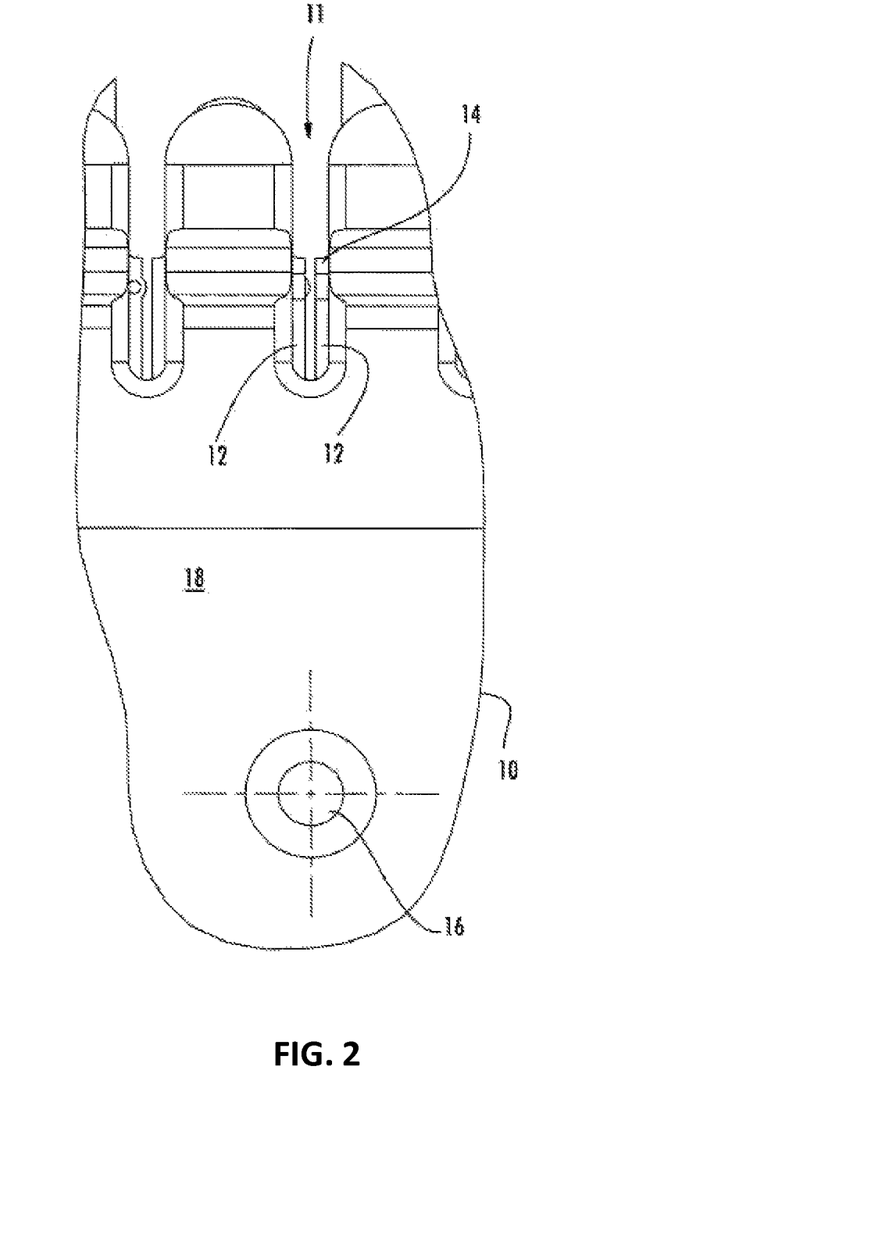
FIG. 2 schematically depicts an enlarged side view of the connector assembly of FIG. 1, according to one or more embodiments disclosed herein.

FIGS. 1 and 2 illustrate a connector assembly 10 comprising at least one insulation displacement member 12. For example, the connector assembly 10 may be representative of a number of different types of connector assemblies, such as, but not limited to, an interface connector (e.g., a UMOXS1A connector available from Corning Cable Systems LLC of Hickory, N.C., hereinafter "CCS"), a bridging connector (e.g., a UMOXS2A connector also available from CCS), or a multiplexing connector (e.g., a UMOXS5A connector also available from CCS). However, it should be appreciated that the connector assemblies described herein are not limited to the specific connector assemblies identified above, and as such, the protective coatings described herein may be suitable for other connector assembly designs. For example, the protective coatings described herein may be suitable for use on the connector assemblies described in U.S. Pat. Nos. 5,571,029, 6,299,475, 6,468,103, 7,168,992, and 7,540,759. The connector assembly 10 of FIGS. 1 and 2 comprises a connector framework 18 and at least one insulation displacement member 12 which, upon engagement with a conductor of an insulated electrical wire positioned in one of the insulated-wire passages 11 of the connector assembly 10, defines an electrically conductive path extending from the conductor and the wire engaging portion 14 of the displacement member to an electrical coupling node of the connector assembly 10.

The connector framework 18 may comprise at least one insulated-wire passage 11 that is sized and oriented to receive an insulated electrically conductive wire. In the embodiment shown in FIGS. 1 and 2, the connector framework 18 comprises a plurality of insulated-wire passages 11. In some embodiments, the connector framework 18 may be configured as a housing, and the insulation displacement members 12 may be partially or entirely disposed within the housing. In some embodiments, each insulated-wire passage 11 is coupled with two insulation displacement members 12. Generally, the connector framework 18 may be formed from an electrically non-conductive material, such as a plastic. In one embodiment, the connector framework 18 is formed from polycarbonate. In some embodiments, the connector framework 18 may comprise one or more openings 16 which lead to the interior of the connector framework 18, such as a cavity area below a portion 20 of the connector framework 18 which may house interior portions of the insulation displacement members 12.

As seen in FIG. 2, insulated-wire passage 11 includes two insulation displacement members 12 which each end at a top portion, referred to herein as the wire engaging portion 14. The wire engaging portion 14 of the insulation displacement member 12 is formed from a conductive material and, in a connected state, the tip of the wire engaging portion 14 displaces the insulation of the wire and makes direct contact with the electrical conductor of the wire with which it is engaged. The insulation displacement member 12 may be formed from a metal, and may be further plated with a metal. For example, in one embodiment, the insulation displacement member 12 is formed from copper and is plated with tin. In the embodiments described herein, at least the wire engaging portion 14 of the insulation displacement member 12 may be coated with a protective coating, such that it seals the insulation displacement member 12 from environmental moisture or otherwise protects the insulation displacement member 12 from damage while still providing an electrically conductive path extending from the conductor through the wire engaging portion 14 of the displacement member 12 to the electrical coupling node of the connector assembly 10. Without being limited by theory, it is believed that the conductive path extend through the coating and/or the coating is removed in whole or in part at the tip of the wire engaging portion.

Generally, the insulation displacement member 12 defines an electrically conductive path extending from the wire engaging portion 14 to an electrical coupling node of the connector assembly 10. As used herein, an "electrical coupling node" refers to any point where an electrical signal is made available for conductive transfer. The insulation displacement members 12 may be mechanically supported by the connector framework 18 to permit forcible engagement of the wire engaging portion 14 with insulated electrically conductive wire. For example, the insulation displacement members 12 may be supported such that they allow for the wire engaging portion 14 of the insulation displacement members 12 to pierce through the insulation of an insulated wire, thus making direct contact with the conductive portion of the wire.

The insulation displacement member 12 may be mechanically supported in a static or motive state. For example in a static state, the insulation displacement members 12 are supported such that an insulated wire may be pushed into at least one stationary insulation displacement member 12, such as to allow the wire engaging portion 14 of the insulation displacement member 12 to pierce through the insulation of the wire and make direct electrical contact with the conductor of the wire. In this embodiment, an operator may push the wire into the insulation displacement members 12 to pierce the insulation. In a motive state, the insulation displacement members 12 are supported such that a the wire engaging portion 14 of the insulation displacement member 12 may be engaged with a stationary insulated wire held in the connector framework 18, whereby the wire engaging portion 14 of the insulation displacement member 12 pierces through the insulation of the wire and makes direct electrical contact with the conductor of the wire. For example, in the motive embodiment, an operator may put an insulated wire into place and then clamp down at least one insulation displacement member 12 onto the insulated wire to pierce the insulation.

In the connector assemblies 10 described herein, at least the wire engaging portion 14 of the insulation displacement member 12 is coated with a protective coating. The protective coating may be applied as a coating solution and cured. The protective coatings described herein seal the coated section of the insulation displacement member 12 from environmental moisture or otherwise protect the insulation displacement member 12 from damage. It is contemplated, for example, that the protective coating may seal the coated portion of the insulation displacement member 12 from contaminants, such as water, dust, dirt, or other materials to which the connector assembly 10 may be exposed.

In one embodiment, the protective coating comprises a mono-layer coating. Mono-layer coatings, as described herein, includes coatings that comprise a single layer of atoms or molecules. For example, a mono-layer coating, such as the protective coatings described herein, may have a thickness of the length of a molecule of the coating, such as a thickness of less than or equal to about 100 nm. The small thickness of the protective coatings described herein allows for the connector assembly 10 to function without any bulk physical sealing material that may inhibit movement of the connector assembly 10 and/or insulated wire.

The mono-layer coating may comprise an organosilane chemical composition. Organosilane chemical compositions include chemical compounds derived from silanes that comprise one or more organic groups. For example, protective coating may comprise an alkylsilane, alkoxysilane, or both. Organosilanes may react with water to form silanol groups, such as when present in solution. As used herein, organosilanes include silanes that have silanol groups. In some embodiments, the protective coating may be hydrophobic. In such a hydrophobic protective coating, the organic group of the organosilane may be hydrophobic, such as to impart hydrophobic characteristics when applied as a mono-layer coating.

In one embodiment, the protective coating comprises an alkylsilane chemical composition that can form a mono-layer. For example, the protective coating may comprise octylsilane, nonylsilane, decylsilane, undecylsilane, dodecylsilane, tridecylsilane, tetradecylsilane, pentadecylsilane, hexadecylsilane, heptadecylsilane, octadecylsilane, nonadecylsilane, icosylsilane, heneicosylsilane, docosylsilane, tricosylsilane, etracosylsilane, pentacosylsilane, hexacosylsilane, heptacosylsilane, octacosylsilane, nonacosylsilane, triacontylsilane, hentriacontylsilane, dotriacontylsilane, tritriacontylsilane, tetratriacontylsilane, pentatriacontylsilane, hexatriacontylsilane, or combinations thereof. In one embodiment, the alkyl functionality of the alkylsilane comprises a carbon chain having a length of greater than or equal to 8 carbons and less than or equal to 36 carbons. In another embodiment, the alkyl functionality of the alkylsilane comprises a carbon chain having a length of greater than or equal to 12 carbons and less than or equal to 28 carbons. In yet another embodiment, the alkyl functionality of the alkylsilane comprises a carbon chain having a length of greater than or equal to 16 carbons and less than or equal to 24 carbons. In yet another embodiment, the alkyl functionality of the alkylsilane comprises a carbon chain having a length of 18 carbons. In one embodiment, the protective coating is formed from a commercially available octadecylsilane, Glassclad 18, available from United Chemical Technologies, Inc.

In another embodiment, the protective coating comprises an alkoxysilane chemical composition that can form a mono-layer. For example, the alkoxysilane may be a dimethylsilioxane monomer or oligomer. In one embodiment, the protective coating may comprise methyltrimethoxysilane as the reactive functional group and a silicone oligomer chain as the insulation layer. In one embodiment, the protective coating is formed from a commercially available methyltrimethoxysilane, PS233 Glassclad RC, available from United Chemical Technologies, Inc.

Generally, the protective coatings described herein may be applied to an insulation displacement member 12 by contacting at least a portion the insulation displacement member 12 with a coating solution and subsequently curing the coating solution present on the insulation displacement member 12. The coating solution comprises an organosilane that will be present in the protective coating on the insulation displacement member 12. The coating solution may optionally comprise a solvent with which the organosilane is mixed. For example, in one embodiment, 5 parts by weight of organosilane may be mixed with 100 parts by weight of de-ionized water. However, other solvents may be used and varying ratios of solvent to organosilane may be used.

The insulation displacement member 12 may be contacted with the organosilane coating solution in any a variety of processes, including, without limitation, submersion, misting, spraying, or any other like process. In an exemplary embodiment, the insulation displacement member 12 is submerged in the coating solution for about 1 to about 5 minutes. Ultrasonic vibration of the insulation displacement member 12 or agitation of the coating solution may be utilized.

Without being bound by theory, in an aqueous solution embodiment of the organosilane solution, it is believed that after dissolving the organosilane in water, the organosilane reacts with water to form a silanol-rich prepolymer. The silanol-rich prepolymer is able to condense with available hydroxyl groups on the substrate, the coated portion of the insulation displacement member 12. The condensation reaction allows the polymer to be grafted permanently onto the substrate and cover the substrate with a mono layer of organosilane. Furthermore, in some embodiments, the insulation displacement member 12 comprise copper plated with tin. In such an embodiment, without being bound by theory, it is believed that the surface of the insulation displacement member 12 is hydrophilic and has at least some moisture absorbed on its surface. This moisture may allow the organosilane to react with and bond to the insulation displacement member 12.

In one embodiment, prior to contacting the insulation displacement member 12 with the coating solution, the insulation displacement member 12 is cleaned. Such cleaning may be performed by contact with an acid, such as, but not limited to, isopropyl alcohol. The insulation displacement member 12 may be cleaned by being contacted with an acid in any a variety of processes, including, without limitation, submersion, misting, spraying, or any other like process. The insulation displacement member 12 is dipped and submerged in acid for about 60 seconds to about 30 minutes. In an exemplary embodiment, the insulation displacement member 12 is dipped and submerged in acid for about 10 minutes. Ultrasonic vibration of the insulation displacement member 12 or agitation of the coating solution may be utilized.

Once the organosilane coating solution has been applied to the insulation displacement member 12, the organosilane coating solution is cured. The organosilane coating solution may be cured at a temperature of at least about 50° C. to form a connector assembly 10 comprising an insulation displacement member 12 comprising an organosilane mono-layer protective coating. In other embodiments, the organosilane coating solution may be cured at a temperature of at least about 60° C., at least about 70° C., at least about 80° C., at least about 90° C., at least about 100° C., or even at least about 105° C. The curing may be for a time period of several minutes, such as, for example, about 1 minute, about 3 minutes, about 5 minutes, or about 10 minutes. In one exemplary embodiment, the silane coating solution is cured for about 5 minutes at a temperature of about 105° C. However, appropriate curing times and temperatures may differ based on the coating solution used. Without being bound by theory, it is believed that the curing step drives off volatiles, such as water or other solvents, as well as chemically bonds the coating to the surface of the insulation displacement member 12.

In one embodiment, the protective coating may be applied to an insulation displacement member 12 in an assembled connector assembly 10. In such an embodiment, the insulation displacement member 12 is mechanically supported by the connector framework 18 while the insulation displacement member 12 is contacted with the coating solution. In such an embodiment, the connector assembly 10 is manufactured by a method comprising assembling the connector assembly 10 by mechanically supporting an insulation displacement member 12 with a connector framework 18, contacting at least the wire engaging portion 14 of the insulation displacement member 12 and at least a portion of the connector assembly 10 with an organosilane coating solution, and curing the organosilane coating solution, as described above, to form a connector assembly 10 comprising an insulation displacement member 12 comprising a hydrophobic organosilane mono-layer protective coating. In such an embodiment, the insulation displacement member 12 may be contacted with the organosilane coating solution by submerging the connector assembly 10 comprising the insulation displacement member 12 and connector framework 18 in the organosilane coating solution. If cleaning is desired prior to coating, the assembled connector assembly 10 may be submerged in acid prior to coating.

In one embodiment, such as shown in FIGS. 1 and 2, the connector framework 18 forms a housing, wherein the insulation displacement member 12 is at least partially housed inside of the connector framework 18 and the connector framework 18 comprises an opening 16 that allows the coating solution to flow into the interior of the housing. This allows portions of the insulation displacement member 12 that are inside of the housing to be coated while in an assembled state.

In some embodiments, the respective compositions of the organosilane coating solution and the connector framework 18 are such that the connector assembly 10 does not comprise the hydrophobic organosilane mono-layer protective coating upon curing. For example, in exemplary embodiments, the insulation displacement member 12 may be formed primarily of a material that may be hydrophilic relative to a material of the connector framework 18. For example, insulation displacement member 12 may be formed primarily of a metal material and the connector framework 18 may be formed primarily of polycarbonate. This allows the organosilane coating solution to only stick to the hydrophilic insulation displacement member 12, and not to the connector framework 18. In such an embodiment, since the entire connector assembly 10 is assembled prior to coating, only the exposed portion of insulation displacement member 12 may be completely coated and an unexposed portion of the insulation displacement member 12 may not be coated. For example, areas of the insulation displacement member 12 that are covered by the connector framework 18 will not be coated since they are not exposed to the coating solution.

In another embodiment, the protective coating may be applied to an unassembled insulation displacement member 12. In such an embodiment, following the application of the protective coating to the insulation displacement member 12 (in an unassembled state), the insulation displacement member 12 is assembled with the connector framework 18 by mechanically supporting the insulation displacement member 12 with the connector framework 18. In such an embodiment, the connector assembly 10 is manufactured by a method comprising contacting at least the wire engaging portion 14 of an insulation displacement member 12 with an organosilane coating solution, curing the organosilane coating solution, as described herein, to form an insulation displacement member 12 comprising a hydrophobic organosilane mono-layer protective coating, and assembling the connector assembly 10 by mechanically supporting the insulation displacement member 12 comprising the hydrophobic organosilane mono-layer protective coating with a connector framework 18. In such an embodiment, the insulation displacement member 12 may be contacted with the organosilane coating solution by submerging the insulation displacement member 12 in the organosilane coating solution. In such an embodiment, since the insulation displacement member 12 is coated prior to its assembly with the connector framework 18, the insulation displacement member 12 may be coated on all surfaces. If cleaning is desired prior to coating, the insulation displacement member 12, in an unassembled state, may be submerged in acid prior to coating.

It should now be understood that the connector assemblies 10 disclosed herein have insulation displacement members 12 that are at least partially environmentally sealed from moisture and other material that may damage the insulation displacement member. Furthermore, the connector assemblies 10 described herein, in various embodiments, may have the features of enhanced scratch protection of the coated portions of the insulation displacement members 12, good environmental aging characteristics, especially as compared with some gel sealants, and a lack of an oily, adherent residue on the surfaces of the connector assemblies 10, especially as compared with some gel sealants. Furthermore, in various embodiments described herein, these connector assemblies 10 may be suitable for indoor and outdoor use.

For the purposes of describing and defining the present disclosure it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated herein.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims.

What is claimed is:

1. A connector assembly comprising a connector framework and at least one insulation displacement member, wherein:

the connector framework comprises an insulated-wire passage that is sized and oriented to receive an insulated electrically conductive wire;

the insulation displacement member comprises a conductive wire engaging portion and is mechanically supported by the connector framework to permit forcible engagement of the wire engaging portion with the insulated electrically conductive wire to make electrical contact with a conductor therein, the conductive wire engaging portion of the insulation displacement member defining an electrically conductive path extending from the wire engaging portion to an electrical coupling node of the connector assembly;

at least the conductive wire engaging portion of the insulation displacement member is coated with a cured hydrophobic organosilane mono-layer protective coating.

2. The connector assembly of claim 1, wherein the protective coating comprises an alkoxysilane.

3. The connector assembly of claim 1, wherein the insulation displacement member is mechanically supported in a static or motive state.

4. The connector assembly of claim 1, wherein the connector framework is not electrically conductive.

5. The connector assembly of claim 1, wherein the connector framework comprises polycarbonate.

6. The connector assembly of claim 1, wherein the connector framework is configured as a housing and the insulation displacement member is partially or entirely disposed within the housing.

7. The connector assembly of claim 1, wherein only an exposed portion of insulation displacement member is completely coated and an unexposed portion of the insulation displacement member is not coated.

8. The connector assembly of claim 1, wherein the insulation displacement member is coated on all surfaces.

9. The connector assembly of claim 1, wherein the protective coating comprises an alkylsilane.

10. The connector assembly of claim 9, wherein an alkyl functionality of the alkylsilane comprises a carbon chain having a length of greater than or equal to 8 carbons and less than or equal to 36 carbons.

* * * * *